US010242563B2

(12) United States Patent
MacKenzie et al.

(10) Patent No.: US 10,242,563 B2
(45) Date of Patent: Mar. 26, 2019

(54) METHOD, DIGITAL TOOL, DEVICE AND SYSTEM FOR DETECTING/RECOGNIZING IN A RADIO RANGE, IN PARTICULAR OF AN INDOOR AREA, REPETITIVE MOTIONS, IN PARTICULAR RHYTHMIC GESTURES, WITH AT LEAST ONE MOTIONAL SPEED AND EACH AT LEAST ONE REPETITION

(71) Applicant: Siemens Schweiz AG, Zürich (CH)

(72) Inventors: Kyle MacKenzie, Lincoln, RI (US);
Alejandro Ramirez, München (DE);
Corina Kim Schindhelm, München (DE)

(73) Assignee: SIEMENS SCHWEIZ AG (CH)

( * ) Notice: Subject to any disclaimer, the term of this patent is extended or adjusted under 35 U.S.C. 154(b) by 0 days.

(21) Appl. No.: 15/522,401

(22) PCT Filed: Oct. 30, 2015

(86) PCT No.: PCT/EP2015/075315
§ 371 (c)(1),
(2) Date: Apr. 27, 2017

(87) PCT Pub. No.: WO2016/066824
PCT Pub. Date: May 6, 2016

(65) Prior Publication Data
US 2017/0365163 A1 Dec. 21, 2017

(30) Foreign Application Priority Data

Oct. 31, 2014 (EP) .................................. 14191345
Aug. 20, 2015 (EP) .................................. 15181832
Aug. 20, 2015 (EP) .................................. 15181834

(51) Int. Cl.
*G08B 13/24* (2006.01)
*G08C 17/02* (2006.01)
*G01S 13/00* (2006.01)
*G01S 13/56* (2006.01)
*G01S 13/88* (2006.01)

(52) U.S. Cl.
CPC ............ *G08C 17/02* (2013.01); *G01S 13/003* (2013.01); *G01S 13/56* (2013.01); *G01S 13/88* (2013.01);
(Continued)

(58) Field of Classification Search
None
See application file for complete search history.

(56) References Cited

U.S. PATENT DOCUMENTS 5,815,813 A * 9/1998 Faruque ................ H04W 16/00
455/446
7,088,236 B2 * 8/2006 Sorensen ................ G01V 3/12
340/539.13
(Continued)

FOREIGN PATENT DOCUMENTS

CN 104502894 A 4/2015
WO WO 2013164628 A1 11/2013

OTHER PUBLICATIONS

Rein T.: Energy and Time Efficient Link-Quality Estimation for Wireless Sensor Networks, Master Thesis, Apr. 2007.
(Continued)

*Primary Examiner* — K. Wong
(74) *Attorney, Agent, or Firm* — Schmeiser, Olsen & Watts, LLP

(57) ABSTRACT

A method, device, and system for detecting/recognizing in a radio range repetitive motions with at least one motional speed and each at least one repetition, is provided. The method includes the steps of collecting as input data for the repetitive motion detection/recognition based on the reception of quantifiable radio signals of an intended or unintended communication between a transmitting radio terminal being mobile or fixed and a receiving local fixed radio device in the radio range "Received Signal Strength"-values related quantities or "Channel State Information"-quantities,
(Continued)

and determining a pattern in the received radio signals, and accessing the peak value until the peak value in accordance with a threshold check provides a reliable statement, particularly being used for controlling purposes.

38 Claims, 8 Drawing Sheets

(52) U.S. Cl.
CPC ......... *G08B 13/24* (2013.01); *G08B 13/2491* (2013.01); *G08C 2201/32* (2013.01)

(56) References Cited

U.S. PATENT DOCUMENTS

| | | | |
|---|---|---|---|
| 7,804,441 B1 * | 9/2010 | DeChiaro, Jr. | ........ G01V 8/005 342/22 |
| 8,384,614 B2 * | 2/2013 | Kennedy | .............. H01Q 19/065 343/909 |
| 2004/0080415 A1 | 4/2004 | Sorensen | |
| 2005/0055568 A1 | 3/2005 | Agrawala | |

OTHER PUBLICATIONS

Cottingham D.N.: Vehicular wireless communication, Technical Report, No. 741, University of Cambridge, Computer Laboratory, Jan. 2009.

IEEE Std 802.11nTM-2009, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput, Oct. 29, 2009.

International Search Report for PCT Application No. PCT/EP2015/075315, dated Feb. 16, 2016.

* cited by examiner

METHOD, DIGITAL TOOL, DEVICE AND SYSTEM FOR DETECTING/RECOGNIZING IN A RADIO RANGE, IN PARTICULAR OF AN INDOOR AREA, REPETITIVE MOTIONS, IN PARTICULAR RHYTHMIC GESTURES, WITH AT LEAST ONE MOTIONAL SPEED AND EACH AT LEAST ONE REPETITION

CROSS-REFERENCE TO RELATED APPLICATIONS

This application claims priority to PCT Application No. PCT/EP2015/075315, having a filing date of Oct. 30, 2015, based off of European application no. EP 14191345.9, filed on Oct. 31, 2014 and European application nos. EP 15181834.1, and EP 15181832.5, both having a filing date of Aug. 20, 2015, the entire contents of which are hereby incorporated by reference.

FIELD OF TECHNOLOGY

The following relates to a method for detecting/recognizing in a radio range, in particular of an indoor area, repetitive motions, in particular rhythmic gestures, with at least one motional speed and each at least one repetition, a digital tool for detecting/recognizing in a radio range, in particular of an indoor area, repetitive motions, in particular rhythmic gestures, with at least one motional speed and each at least one repetition, a device for detecting/recognizing in a radio range, in particular of an indoor area, repetitive motions, in particular rhythmic gestures, with at least one motional speed and each at least one repetition, and a system for detecting/recognizing in a radio range, in particular of an indoor area, repetitive motions, in particular rhythmic gestures, with at least one motional speed and each at least one repetition.

BACKGROUND

For detecting/recognizing repetitive motions, in particular rhythmic gestures, with at least one motional speed and each at least one repetition in a limited area, in particular of an indoor area, many different approaches (e.g. methods, systems, etc.) exist, but all of them have each pros and cons. A limited area besides the mentioned indoor area but outside of a building is for example a radio range, whereby the limitation is given by the radio coverage.

There are many examples of methods for detecting/recognizing repetitive motions, in particular rhythmic gestures, used in products on the market today. However they all have drawbacks that make them ill-suited for use as part of a modern home automation system. The vast majority of solutions fit into one of two general categories:
  Camera-based solutions and
  Hardware controller-based solutions.

Both of these categories have the same problem that they require additional hardware to function. This means that they do not fulfill the requirement of maintaining low cost and simplicity.

Hardware controllers, such as a remote control fitted with a gyroscope, also have the obvious problem that they require the user to carry a physical device. This defeats a lot of the purpose of having a gesture recognition system in the first place since the user could simply push a button on the remote instead.

Camera-based gesture recognition, while avoiding the problem of requiring the user to carry an additional device, does not sufficiently satisfy the point of respecting the user's privacy. MICROSOFT KINECT is an example of a camera-based gesture recognition device. MICROSOFT was met with serious criticism when it announced it would require the KINECT for the XBOX ONE to always be on in order for the console to work. This policy was especially unpopular in countries like Germany and Australia and MICROSOFT eventually reversed its policy. Due to the nature of a home automation implementation, it would be difficult to avoid an always-on solution.

Besides the previous mentioned conventional approaches there are a few new technologies that take advantage of the ubiquitous presence of wireless communication networks in modern homes and buildings. Specifically, these include the projects "WiSee" and "AllSee" from the University of Washington. Both of these projects have the problem that they require non-standard or proprietary hardware. "AllSee" has a significant custom hardware component and "WiSee" uses an expensive software defined radio and many antennas. Thus, neither qualifies as using off-the-shelf hardware.

Yet another similar project is "Wi-Vi" from the Massachusetts Institute of Technology, which also uses multi-antenna hardware with special antenna separation for sending and receiving simultaneously through complicated software defined radio hardware to achieve the gesture recognition.

A further project which claims to see through walls using "Wi-Fi" has been developed by the University of California, Santa Barbara, which uses laser scanners, specially calibrated tires, for centimeter-millimeter controlled movement of synchronized robots and specially directed high-gain antennas to obtain the signal. This is a complicated solution, which uses robots instead of the simple off-the-shelf wireless hardware.

Other approaches may exist. But none of the currently fulfill the following requirements raised out of the above reflection of the different approaches:
  Fast acting,
  Covering the limited area (e.g. a radio range), in particular the whole apartment,
  People carrying no devices
  Off-the-shelf hardware and
  Single-Sensor.

SUMMARY

An aspect relates to a method, a digital tool, a device and a system for detecting/recognizing in a radio range, in particular of an indoor area, repetitive motions, in particular rhythmic gestures, with at least one motional speed and each at least one repetition, which enables easily with a minimum of hardware complexity an automated detection/recognition of repetitive motions based on a Single-Sensor, which fulfills in addition the other requirements cited above.

An embodiment of the present invention includes a method or digital tool or device or that enables each an automated, preferably hard- and software-related, wireless-based detection/recognition of repetitive motions, e.g. rhythmic gestures, with at least one motional speed and each at least one repetition influencing transmitted radio signals of at least one radio terminal in a radio range, e.g. an indoor area—especially different rooms inside of an apartment, by:

Collecting as input data for the repetitive motion detection/recognition based on the reception of quantifiable radio signals, in particular "Wireless Local Area Network [WLAN]"/"Wireless Fidelity [WiFi]"-signals according to IEEE 802.11, of an intended or unintended communication between a transmitting radio terminal being mobile or fixed and a receiving local fixed radio device in the radio range:

(1) a "Received Signal Strength [RSS]"-values related quantity, e.g. a "Received Signal Strength Indication [RSSI]"-quantity, a "Signal to Noise Ratio [SNR]"-quantity, a "Channel Quality Indication [CQI]"-quantity, a "Packet Reception Rate [PRR]"-quantity, a "Packet Loss Rate [PLR]"-quantity, a "Signal to Interference Ratio [SIR]"-quantity and/or a "Signal to Interference plus Noise Ratio [SINR]"-quantity, {For a wireless-based detection/recognition of repetitive motions following the wireless-link estimation with its metrics, the choice of an appropriate characteristic is fundamental. A very basic indicator—besides for example the "Received Signal Strength Indication [RSSI]", the "Signal to Noise Ratio [SNR]", the "Channel Quality Indication [CQI]", the "Signal to Interference Ratio [SIR]" and the "Signal to Interference plus Noise Ratio [SINR]"—but also important and useful indicator is the "Packet Reception Rate [PRR]" with its complement, the "Packet Loss Rate [PLR]". The "Packet Reception Rate [PRR]" is basically the number of received packets at a receiver in relation to all the sent packets by a transmitter or (2) a "Channel State Information [CSI]"-quantity, Determining a pattern in the received radio signals, which are derived from the facts that the repetitive motions are significantly distinct such that they influence the transmitted radio signal in the radio range, e.g. by at least one of reflection, refraction, diffraction and absorption, based on the collected "Received Signal Strength [RSS]"-values related quantities or the collected "Channel State Information [CSI]"-quantities by employing autocorrelation on the quantities and a "Fast Fourier Transform [FFT]" on the autocorrelated quantities in the form of a peak value at an at least one frequency related to the at least one speed of the repetitive motion, and Assessing the determined peak value until the determined peak value in accordance with a threshold check provides a reliable statement, which is preferably at least one detection/recognition data (digital form of the statement) or at least one detection/recognition signal (analogue form of the statement), particularly being used for controlling purposes, e.g. a YES-/NO-statement representing for instance a Switched ON/OFF—respectively Switched OFF/ON-status of an appliance.

An exemplary embodiment of the invention use a simple existing "WLAN/WiFi"-device in listening mode, and runs software on only this equipment. No additional hardware or software components are required, except for any standard off-the-shelf "WLAN/WiFi"-device in the environment to be transmitting anything. Thus it maintains low cost and simplicity, which are important factors. The approach enables a new way of performing repetitive motion detection/recognition, in particular rhythmic gesture detection/recognition, that works through walls and does not require new hardware of any kind, keeping the cost and complexity low, and also avoiding the types of privacy concerns present when using cameras as a solution. Of course, also such an approach can also be threatening to the user's sense of privacy as well. For this reason it is important that the specific means of input to the gesture recognition feature not be invasive of the user's privacy, meaning that the specific user cannot be personally identified.

It enables further to detect how often there is a disturbance in a wireless channel. If the channel is disturbed in a non-random and repetitive way, it can be classified the frequency of the repetition. This allows for detection of gestures like waving.

Instead of the preferred embodiment based on the "Wireless Local Area Network [WLAN]"/"Wireless Fidelity [WiFi]"-communication according to IEEE 802.11 other embodiments are possible, which are based on any wireless communication according to, for example, "Bluetooth", "DECT" and "ZigBee".

Thereby it is assumed that there will be wireless traffic coming from devices located physically within or around the radio range as the desired detection/recognition zone. If no traffic exists, the local fixed radio device may generate it itself. As an example implementation, the desired detection/recognition zone might be a home (house, apartment etc.) and the local fixed radio device on which the subject matter of embodiments of the invention implemented is for instance a smart television. Other wireless devices in the home that can generate wireless traffic could include an access point, one or more laptop computers, mobile phones, tablets, and other smart devices.

The controlling purpose could be the automatically controlling of domestic appliances or facilities, in particular heating, climate control, lighting or security facility, or in general all aspects concerning home automation and home entertainment.

Moreover the controlling purpose might consist in that the at least one frequency related to the at least one speed of the repetitive motion, the peak value is determined at, is used to code a freely selectable operational status of the domestic appliance or facility or in general the home automation and the home entertainment.

There are many cases where the repetitive motion, in particular the gesture, detection/recognition by a home automation controller would be useful, such as changing the temperature set point of a room. In this situation the user could simply wave his or her arm in a specific pattern to turn the temperature up or down, eliminating the need to interact directly with either the home controller or a thermostat. There are also countless other applications for gesture recognition in a home automation system such as turning lights or other appliances on and off, starting a coffee machine from bed, changing the channel on the television and so on.

The most important point is that embodiments of the invention would not require the addition of any new hardware as it can be used the existing wireless infrastructure to collect the data. It is also important to implement the system entirely in software and only in one device, so that embodiments of the invention have a major economic advantage. The repetitive motion, in particular the gesture, detection/recognition feature could be added to new products as well as existing devices by a simple software update. This provides enormous flexibility because the decision can be made to update products already on the market, thus increasing their longevity by helping them remain competitive, or the update could be withheld for new products.

Another important point is that the only external requirement for the system to work is that there is wireless traffic in the area, which our device could generate if there wasn't any traffic. The device on which the repetitive motion, in particular the gesture, detection/recognition software is installed would not even be required to authenticate with a network because the information being use regards the radio channel and not the encrypted data. The only requirement is that it can listen to nearby traffic. Because of the ubiquity of wireless enabled devices in modern homes and buildings, this requirement is trivial to satisfy.

Yet another important advantage over other systems is that no calibration is required, as it will do a comparison of the signal against itself.

The specific nature of embodiments of the invention is that:

(1) The person, whose repetitive motion in the radio range with the transmitting radio device and the receiving radio device should be/is detected, must not carry themselves any electronic device transmitting the radio signals.

(2) The repetitive motion detection/recognition doesn't provide any information to individually identify the person or persons in the radio range, just know if there is anybody inside (presence detection; cf. the remarks above) doing some repetitive motions and to identify the specific place within the radio range in which person is or the persons are located.

(3) It is enough to have a single point in the radio range, the local fixed radio device, working as a sensor for the radios signals and the changes therein; for this reason one speaks of a "single-sensor".

(4) A channel estimation function inside a commercial off-the-shelf WLAN/WiFi-radio interface is used in the local fixed radio device. The only information being required is a "Received Signal Strength [RSS]"-values related quantity such as preferably a "Received Signal Strength Indication [RSSI]"-quantity or a "Channel State Information (CSI)"-quantity. The RSSI-quantity or the CSI-quantity is commonly provided by IEEE 802.11 devices and can be retrieved for use in applications without hardware modification and, in most cases, also without firmware modification.

To access the information being required methods in conformity to the IEEE 802.11 standard are used to access the RSSI-quantity or the CSI-quantity for the repetitive motion detection/recognition inside the radio range, preferably a room.

Regarding the RSSI-quantity for the repetitive motion detection/recognition it should be mentioned that Signal strength is affected by many factors in the environment. Metal objects, for example, may reflect the signal and create constructive or destructive interference. Water, as well as other materials, is also known to absorb RF-signals in the frequency range of IEEE 802.11. These properties are used to determine when there is a repetitive motion in the area. If the RSSI-quantity remains relatively stable it is assumed that there is no repetitive motion. If the RSSI-quantity is unstable then there may be repetitive motion.

In a typical indoor environment, there will be objects and infrastructure of many different materials reflecting the signal. This multi-path effect means that the RSSI-quantity will be sensitive to environmental changes outside the line of sight between the transmitter and receiver. This means that the solution according to embodiments of the invention is advantageous for detecting/recognizing repetitive motions in an entire room or possibly multiple rooms depending on the physical placement of the wireless devices.

Regarding the CSI-quantity for the repetitive motion detection/recognition the meaning of "Channel State Information [CSI]" should be explained.

The wireless communication channel is very unstable. Reflections, refractions, diffractions and absorptions of the signal happens constantly, as there are walls, doors, furniture and people located around two communicating devices. The wireless signals being received are not only affected by the obstacles in the direct line-of-sight between the devices. It is also affected by anything that can cause a reflection, which will forward energy towards the receiving antenna. For this reason, almost every wireless communications standard includes a calibration phase during the communication. This is done by sending a data sequence known beforehand which is called "preamble" and defined by the standard. The receiver will then compare the received signal with the sent signal in the frequency domain, so that it can build a "compensation vector". In the case that a "Multiple Input Multiple Output (MIMO)" system is used, compensation is done per antenna, which leads to a "compensation matrix" instead of a "compensation vector".

When the CSI-Matrix will contain the information about the channel, which is directly affected by the obstacles in the room, then a change in the matrix will imply a change in the channel, which will then imply a change in the obstacles in the room. A large change in the matrix will imply a large change in the reflections generated. A static matrix will mean that the channel stayed the same, meaning no repetitive motion was present. A static matrix is impossible to encounter in real life, due to thermal noise and similar effects.

The CSI-matrix can only be obtained from the local radio device, if the driver therein allows it. However, the capability of obtaining it locally is not available in all drivers present on the market today. For this reason we have developed an additional way of achieving this: The IEEE802.11n-2009 amendment to the IEEE802.11 standard allows a standardized way of obtaining the CSI-matrix from a remote device. This information will be obtained inside a CSI-frame (cf. IEEE802.11n-2009, Section 7.4.10.6), which contains a field called "CSI Report Field" (cf. IEEE802.11n-2009, Section 7.3.1.27). Through this, one device can obtain the CSI-matrixes of all devices in the radio range, allowing for a monitoring of a large area of coverage from one single point.

This however will only work if the measuring WLAN/WiFi-device is static, which is the case due to the local fixed radio device. Moving the device will lead to great changes in the reflections received, even if no repetitive motions in the room are present.

To do the repetitive motion detection/recognition the RSSI-quantity or the CSI-quantity is used as a measure of the disturbance on the channel. Once the raw RSSI- or CSI-data is obtained, it is looked for patterns by autocorrelating the data. To obtain the frequency a fast Fourier transform on the autocorrelated data is performed. Once the data has been transformed it is found that the maximum value will be located at the most common frequency. The implication of this is that different frequencies can be defined as different repetitive motions. For example, a frequency of 2 Hz can trigger a home automation system to turn on the lights in the room and a frequency of 4 Hz can turn the lights off. The number of possible distinct gestures would then only be limited by the ability of the user to reproduce different frequencies accurately.

Combinations of different frequencies could also be used, as well as longer gestures which include movement using different speeds.

It is very important to point out that the repetitive motions such as gestures don't have to take place in the direct path between the sender and the receiver. The repetitive motion/gesture is not simply about partially blocking the signal repeatedly; it is a lot more complicated than that as the hand movement may actually increase the received signal during part of the traveled distance.

The repetitive motions/rhythmic gestures which are not taking place inside the direct Line-of-Sight (LoS) will create four types of alterations for indirect reception:

Reflection: mirroring of signals though metallic items

Absorption: Signals are partially silenced Diffraction: Waves hit on an object that functions as a "lens", affecting some wavelengths more than others (like a prism)

Refraction: Change of direction due to changed density during travel (like a straw in a glass of water)

Each of them will have a different effect on the signal which will reduce or amplify the received "Received Signal Strength [RSS]" In a real scenario with multipath, the exact effect of waving a hand on the signal cannot be known beforehand. However, this effect, no matter how complicated it is, will be repeated when I repeat the waving of the hand. That is exactly why the auto-correlation is a key element of the proposed solution.

Of a sui generis design the subject matter of embodiments of the invention is preferably on one side either a Method or a Digital Tool and on the other either a Device or a System.

The Digital Tool according to the claim 8 includes a program module running on a processor, whereby the program module is preferably downloadable from a server or cloud or is uploadable via a USB-stick or in addition is stored or uploadable or downloadable into a storage media being inserted or insertable into the Device including a processor and a radio interface. Regarding the cited options (alternatives) the Digital Tool is preferably an "App" (Application Software) running on processors of different radio devices, which could be a desktop PC or an "All-In-One" PC incorporating each a radio interface, a smartphone, a notebook, a tablet etc. In other words the Digital Tool is preferably a purpose-designed computer program product. The Digital Tool can be sold or distributed separately or in common with the device or the system for detecting/recognizing repetitive motions. Such a device or system could be for example a telecommunication appliance, a domestic appliance, a medical appliance, a home automation system, a home entertainment system etc.

In the following a possible step-based "use-case-scenario" due to a repetitive motion detection/recognition, in particular rhythmic gesture detection/recognition, is given:

Step 1: A user desires to increase the temperature of his house.

Step 2: A system for repetitive motion detection/recognition, in particular rhythmic gesture detection/recognition, is running in the background, observing the wireless signals and looking for predefined repetitive motions/rhythmic gestures.

Step 3 (being optional): The user draws a predefined gesture in the air with his hand. The gesture consists of a repeating pattern with a rough predetermined speed. The meaning of this gesture is to wake up the system.

Step 4 (being optional): The system detects a predefined gesture to wake up and gets ready to detect another gesture.

Step 5: The user draws a predefined gesture in the air with his hand. The gesture consists of a repeating pattern with a rough predetermined speed. The meaning of this gesture is to raise the temperature.

Step 6: The system detects a predefined gesture to increase the temperature and send a signal to an external system to increase the temperature Step 7 (being optional): The system sound a confirmation signal that the gesture has been received Step 8 (being optional): The system goes into standby

BRIEF DESCRIPTION

Some of the embodiments will be described in detail, with reference to the following figures, wherein like designations denote like members, wherein.

DETAILED DESCRIPTION

Figure 1:
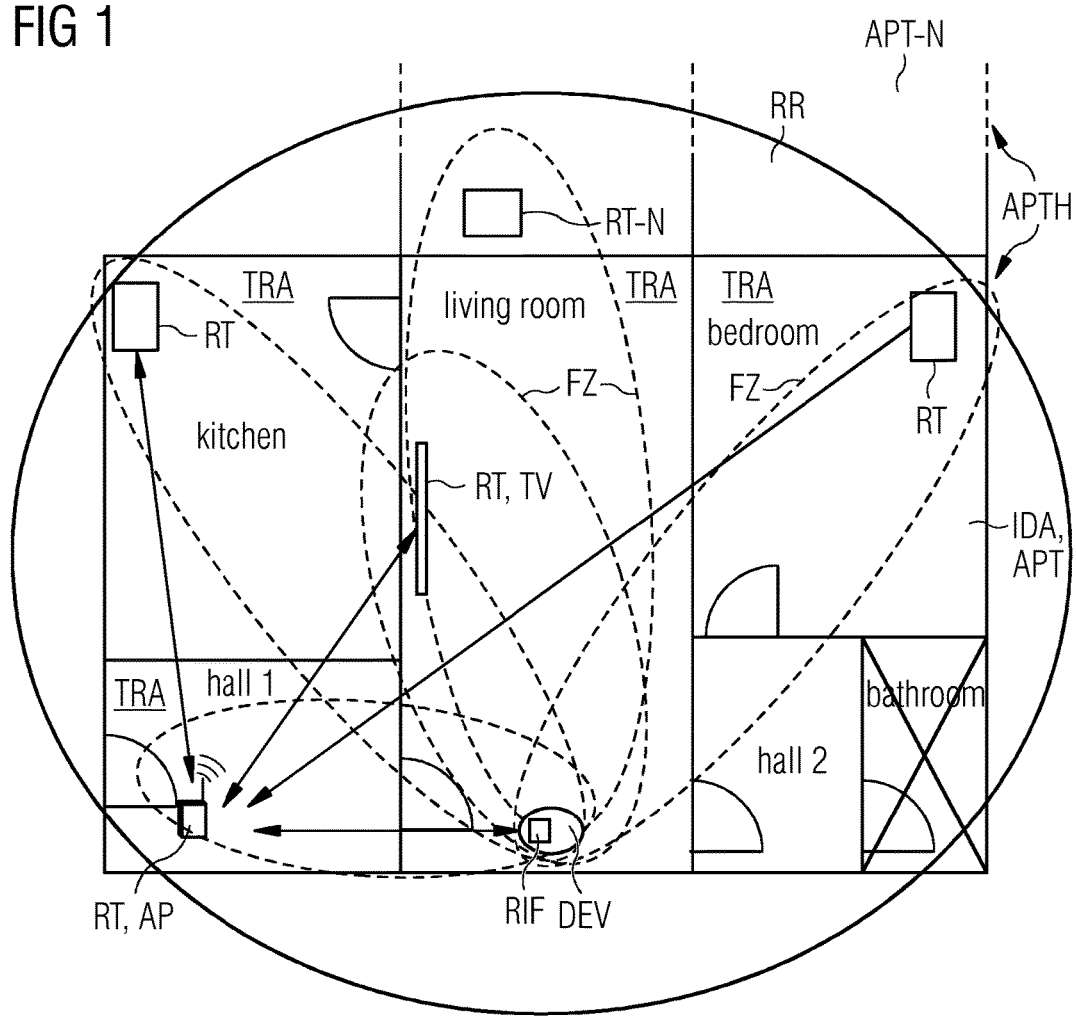
FIG. 1 depicts embodiments of detecting/recognizing repetitive motions, in particular rhythmic gestures, with at least one motional speed and each at least one repetition in a radio range.

FIG. 1 shows a scenario for detecting/recognizing repetitive motions, in particular rhythmic gestures, in an indoor area IDA such as e.g. an apartment APT of an apartment house APTH. Repetitive motions, in particular rhythmic gestures, being detected/recognized in the indoor area IDA could be originated for example from a human, an animal or robots.

Adjacent to the apartment APT is a neighbor apartment APT-N. The depicted apartments APT contain several rooms, six rooms in the apartment APT and two rooms in the neighbor apartment APT-N being graphically outlined. In both apartments APT, APT-N a local area wireless infrastructure is deployed. This could be for instance a "Wireless Local Area Network [WLAN]", but also other wireless technologies are possible such as Bluetooth, DECT, ZigBee, etc. The six rooms in the apartment APT are an entrance hall identified in FIG. 1 by "hall 1", a kitchen, a living room, a bedroom, a dressing room identified in FIG. 1 by "hall 2" and a bathroom, whereby the two rooms of the neighbor apartment APT-N are not identified in detail.

Due to the "Wireless Local Area Network" deployed in each apartment a radio range RR or coverage area is given, which is not inevitable limited to the apartment APT (cf. the depiction in the FIG. 1 where the radio range RR or the coverage area is extended to the neighbor apartment APT-N). In general the radio range RR is essentially given by the maximum distance between a transmitting device transmitting radio signals to a receiving device receiving the transmitted radio signals according to radio frequency "Line-of-Sight [LoS]". Fresnel zones FZ are ellipsoide shaped areas between the antennas of two devices in which the presence of an object will generate destructive reflections, causing an important reduction in the energy transferred. Since the radio signals are transmitted e.g. on a number of radio channels and the radio signal transmission can be realized in both directions the two devices are called transceiving devices. This situation is depicted in the FIG. 1 by a double-arrow and/or the Fresnel ellipse FZ (an ellipse being the 2D representation of an ellipsoid) between two transceiving devices, whereby each the double-arrow indicates an intended communication between the two transceiving devices. This however means that in those cases, where only the Fresnel ellipse or zone FZ without the double-arrow is shown, an unintended communication between the two transceiving devices is present.

The "Wireless Local Area Network" deployed in the apartment APT is formed by several fixed or mobile radio terminals RT, which may be distributed across the apartment APT, and a local fixed radio device DEV with a radio interface RIF encompassing a Radio Program Module, which is a software module sometimes called a driver, which is based on the wireless technology being used. The same could be possible in principle for the neighbor apartment APT-N. However as depicted in the FIG. 1 there is only one fixed or mobile radio terminals RT-N in a room of this apartment APT-N, whereby this radio terminals RT-N transmits unintendedly radio signals to the local fixed radio device DEV in the apartment APT (cf. depicted by the Fresnel ellipse between both devices). If a radio signal is not going to or coming from a dedicated network (e.g. the network within the apartment APT), the signal could be completely ignored. This is done through analysing the sending and receiving addresses in the header of a wireless frame, and will guarantee that a repetitive motion in a neighboring appartment will have no effect on the occupancy detection.

With respect to the apartment APT shown in the FIG. 1 there are four radio terminals RT located in the hall 1, the kitchen, the living room and the bedroom. In the living room there is also located the local fixed radio device DEV. From the cited four radio terminals RT that one in the hall 1 is designed as a wireless access point AP, which is the interface of the "Wireless Local Area Network" to outside networks, e.g. a wired network for Internet and telephony applications. One radio terminal RT of the remaining three radio terminals RT for example that one in the living room is implemented in a television TV. The two other radio terminals RT in the bedroom and in the kitchen could be each for example a tablet or a smartphone. All three remaining radio terminals RT have a direct connection to the wireless access point AP, which is represented by the double-arrows.

In addition to this direct connections the wireless access point AP establishes and maintains each an intended communication with the other three radio terminals RT and the local fixed radio device DEV in the apartment APT although the corresponding Fresnel ellipse FZ is not depicted in each case.

As the local fixed radio device DEV listens to all the radio terminals at the same time, it is able to achieve a "detection/recognition area", which is presented substantially by the coverage of all Fresnel ellipses FZ. In reality, the "detection/recognition area" is not an absolute limit to where the repetitive motion can be detected, as walls and furniture will have some effect on the signal. But it is a very good approximation. Under some circumstances, some rooms may not be covered at all by the "detection/recognition area". This for instance is the case regarding the bathroom. Repetitive motions in rooms that don't have a wireless device may sometimes be detected, if the room is covered (or partially covered) by the wireless propagation of a signal. An example of such a situation would be the hall 2.

Another important, but optional, element is for the local fixed radio device DEV to be capable of a "monitor mode". The monitor mode is a capability present in most WLAN-devices which allows the reception of WLAN frames not directed toward for the local fixed radio device DEV.

One part of the "monitor mode" is done through hardware and another part through software. When the "monitor mode" is enabled an internal MAC filter will stop filtering the frames sent towards the device and will start forwarding the frames directed to other devices.

There are a lot of other implementations possible which differ from the present one. For example the "detection/recognition area" could essentially be as large as the radio range which means that more radio terminals are necessary or significantly smaller which decreases the chances for detecting/recognizing repetitive motions in the radio range.

To implement a repetitive motion detection/recognition in the apartment APT with the "Wireless Local Area Network" existed therein a measurement of the received signal strength or a channel estimation function inside the local fixed radio device DEV with a commercial off-the-shelf radio interface RIF is used. In order to get the repetitive motion detection/recognition the only information being required is either (i) a "Received Signal Strength [RSS]"-values related quantity such as a "Received Signal Strength Indication [RSSI]"-quantity, a "Signal to Noise Ratio [SNR]"-quantity, a "Channel Quality Indication [CQI]"-quantity, a "Packet Reception Rate [PRR]"-quantity a "Packet Loss Rate [PLR]"-quantity, a "Signal to Interference Ratio [SIR]"-quantity and/or a "Signal to Interference plus Noise Ratio [SINR]"-quantity or (ii) a "Channel State Information (CSI)"-quantity.

All quantities are known generally However the RSSI-quantity or the CSI-quantity, which is preferably used, is commonly provided by IEEE 802.11 devices and can be retrieved for use in applications without hardware modification and, in most cases, also without firmware modification.

Regarding the RSSI-quantity for the repetitive motion detection/recognition it should be mentioned that Signal strength is affected by many factors in the environment. Metal objects, for example, may reflect the signal and create constructive or destructive interference. Water, as well as other materials, is also known to absorb RF-signals in the frequency range of IEEE 802.11. These properties are used to determine when there is a repetitive motion in the area. If the RSSI-quantity remains relatively stable it is assumed that there is no repetitive motion. If the RSSI-quantity is unstable then there may be repetitive motion.

In a typical indoor environment, there will be objects and infrastructure of many different materials reflecting the signal. This multi-path effect means that the RSSI-quantity will be sensitive to environmental changes outside the line of sight between the transmitter and receiver. This means that the solution according to embodiments of the invention is advantageous for detecting/recognizing repetitive motions in an entire room or possibly multiple rooms depending on the physical placement of the wireless devices.

At this point it should be referred once again on the statements given above concerning the "Channel State Information [CSI]" and its meaning for the repetitive motion detection/recognition besides the different types of the "Received Signal Strength [RSS]"-values related quantity it might be necessary to explain what is behind the "Channel State Information [CSI]".

The wireless communication channel is very unstable. Reflections, refractions, diffractions and absorptions of a radio signal transmitted between two transceiving devices such as for instance between the wireless access point AP in the hall 1 and the local fixed radio device DEV in the living room happens constantly, because there are walls, doors, furniture and people located around the two communicating devices. The wireless signals being received are not only affected by the obstacles in the direct "Line-of-Sight" between the devices. It is also a fact, that anything that can cause an influence as just mentioned, which will forward energy towards the receiving antenna. This situation is represented by the afore-mentioned Fresnel zones FZ.

For this reason almost every wireless communication standard such as the IEEE 802.11 WLAN-standard defines a calibration phase during the communication. This calibration is done by sending a data sequence known beforehand which is called "preamble", defined by the WLAN-Standard and deployed by the transmitting device. The transmitting device could be the wireless access point AP in the hall 1 or any other radio terminal RT in the apartment APT or the neighbor apartment APT-N. The receiving device, which is in our case the local fixed radio device DEV in the living room, will then compare a received radio signal with the sent preamble signal in the frequency domain, so that the receiving device can form or generate a "compensation vector". In the case that a "Multiple Input Multiple Output [MIMO]"-system is used the compensation is done per antenna which leads to a "compensation matrix" instead of the "compensation vector".

In other words scalar-, vector- or matrix-based "Channel State Information [CSI]"-data are generated. As the CSI-data will contain the information about the channel, which is directly affected by repetitive motions in the apartment, a change in the CSI-data implies a change in the channel, which will then imply repetitive motions in the apartment APT. A large change in the CSI-data will imply a large change in the signals generated and influenced (e.g. by reflections, refractions, diffractions and absorptions). Static CSI-data will mean that the channel state the same, meaning no repetitive motion was present.

This kind of repetitive motion detection/recognition will only work if the measuring local fixed radio device is static. Moving the local fixed radio device DEV will lead to great changes in the influenced signals received, even if no repetitive motion in the apartment APT were present. The CSI-data can only be obtained from the local fixed radio device DEV, if the included radio interface RI comprising a radio module respectively driver, which for example is based on WLAN-technology, allows it. However, a capability of obtaining the CSI-data locally is not available in all radio interface RI respectively drivers used therein, which are present on today's market. For this reason an additional way of achieving the CSI-data must be used. The IEEE 802.11n-2009 amendment to the "IEEE 802.11"-standard specification allows a standardized way of obtaining the CSI-data from a remote device. This information will be obtained inside a CSI-frame (cf. IEEE 802.11n-2009, section 7.4.10.6), which contains a field called "CSI report field" (cf. IEEE 802.11n-2009, section 7.3.1.27). By using this information the local fixed radio device DEV can obtain the CSI-data of all transceiving devices in the radio range RR, preferably the apartment APT, allowing for a monitoring of a large area of coverage from one single point.

To access the information being required methods in conformity to the IEEE 802.11 standard are used to access the RSSI-quantity or the CSI-quantity for the repetitive motion detection/recognition inside the radio range, preferably a room.

This however will only work if the measuring WLAN/WiFi-device is static, which is the case due to the local fixed radio device. Moving the device will lead to great changes in the reflections received, even if no repetitive motions in the room are present.

To do the repetitive motion detection/recognition the RSSI-quantity or the CSI-quantity is used as a measure of the disturbance on the channel. Once the raw RSSI- or CSI-data is obtained, it is looked for patterns by autocorrelating the data. To obtain the frequency a fast Fourier transform on the autocorrelated data is performed. Once the data has been transformed it is found that the maximum value will be located at the most common frequency. The implication of this is that different frequencies can be defined as different repetitive motions. For example, a frequency of 2 Hz can trigger a home automation system to turn on the lights in the room and a frequency of 4 Hz can turn the lights off. The number of possible distinct gestures would then only be limited by the ability of the user to reproduce different frequencies accurately.

Combinations of different frequencies could also be used, as well as longer gestures which include movement using different speeds.

It is very important to point out that the repetitive motions such as gestures don't have to take place in the direct path between the sender and the receiver. The repetitive motion/gesture is not simply about partially blocking the signal repeatedly; it is a lot more complicated than that as the hand movement may actually increase the received signal during part of the traveled distance.

The repetitive motions/rhythmic gestures which are not taking place inside the direct Line-of-Sight (LoS) will create four types of alterations for indirect reception:
Reflection: mirroring of signals though metallic items
Absorption: Signals are partially silenced
Diffraction: Waves hit on an object that functions as a "lens", affecting some wavelengths more than others (like a prism)
Refraction: Change of direction due to changed density during travel (like a straw in a glass of water)

Each of them will have a different effect on the signal which will reduce or amplify the received "Received Signal Strength [RSS]" In a real scenario with multipath, the exact effect of waving a hand on the signal cannot be known beforehand. However, this effect, no matter how complicated it is, will be repeated when I repeat the waving of the hand. That is exactly why the auto-correlation is a key element of the proposed solution.

Figure 2:
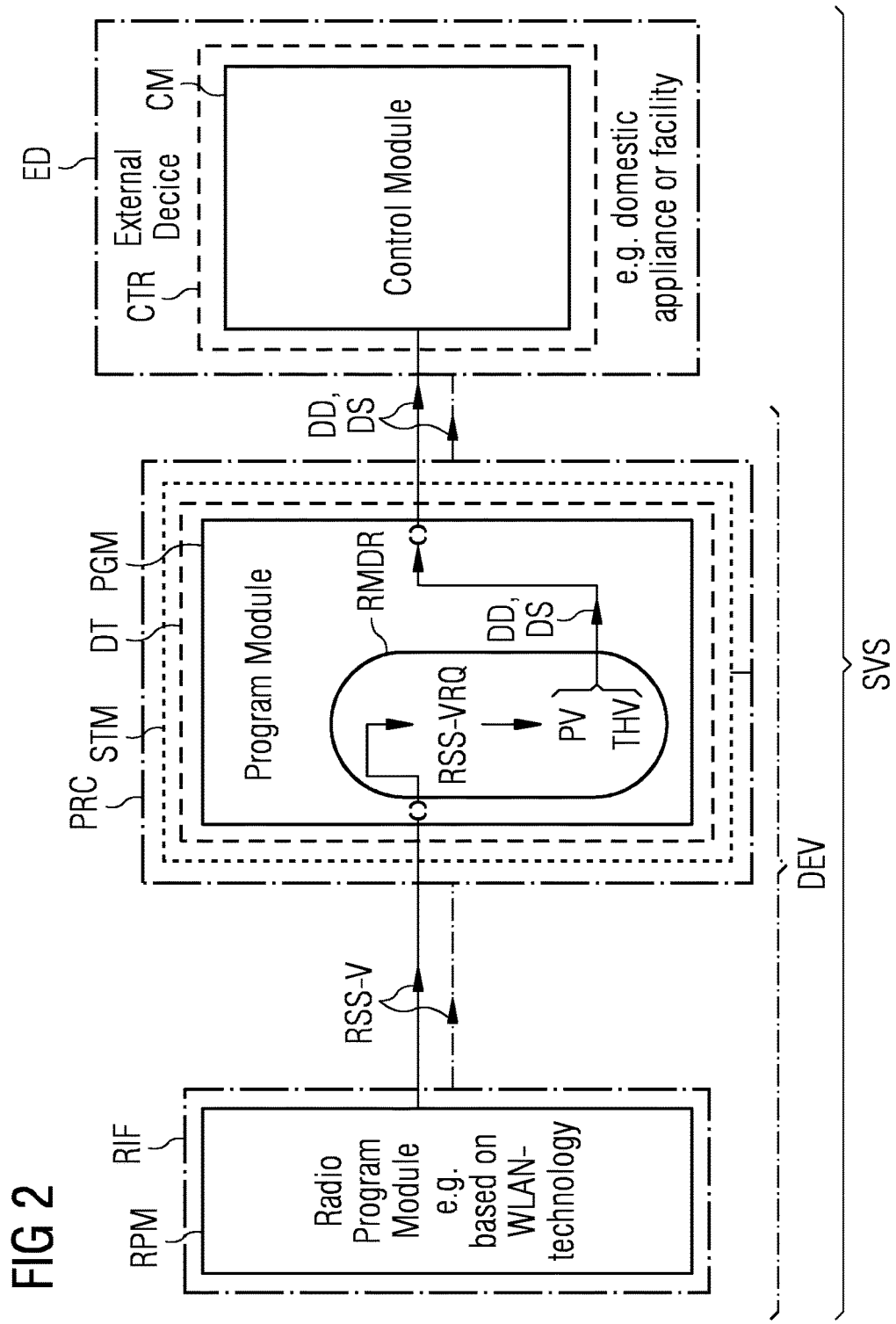
FIG. 2 depicts a layout of an embodiment of a Digital Tool, a device and a system for detecting/recognizing repetitive motions, in particular rhythmic gestures, with at least one motional speed and each at least one repetition in the radio range according to the FIG. 1 as a first embodiment.

FIG. 2 shows a layout based on functional blocks of a Digital Tool DT, the local fixed radio device DEV called as "Device" and a System SYS for detecting/recognizing repetitive motions, in particular rhythmic gestures, with at least one motional speed and each at least one repetition in the radio range RR according to the FIG. 1 as a first embodiment with an "functional block"-interaction on software respective module level (blocks with continuous lines) and on hardware respective device or system level (blocks with dash-dotted lines). All depicted blocks exist in the System SYS, whereas the blocks on the left side and in the middle of the FIG. 2 are part of the Device DEV.

The Digital Tool DT includes (regarding the mentioned software respective module level) a program module PGM being executable on a processor PRC, whereby the program module PGM is preferably downloadable from a server or cloud or is uploadable e.g. via a "Universal Serial Bus [USB]"-stick.

Furthermore (regarding the mentioned hardware respective Device or System level) it is possible that the Digital Tool DT respectively the program module PGM is stored, uploadable or downloadable into a computer-readable storage media STM being inserted or insertable into or integrated in the Device DEV with the processor PRC and the radio interface RIF as mentioned above. The computer-readable storage media STM is assigned to the processor PRC and forms with the processor PRC a common functional unit such that the processor PRC executes the program module PGM stored in the storage media STM.

Regarding the cited options (alternatives) the Digital Tool is preferably an "App" (Application Software) running on a processor of different radio devices, which could be a desktop PC or an "All-In-One" PC incorporating each a radio interface, a smartphone, a notebook, a tablet etc. In other words the Digital Tool is preferably a purpose-designed computer program product. The Digital Tool DT can be sold or distributed separately or in common with the Device DEV or the System SYS for detecting/recognizing repetitive motions. Such a Device or System could be for example a telecommunication appliance, a domestic appliance, a medical appliance, a home automation system, a home entertainment system etc.

For the purpose of a repetitive motion detecting/recognizing RMDR executed by the program module PGM, when according to the scenario shown in the FIG. 1 and described above "Received Signal Strength [RSS]"-values RSS-V received for a number of time frames, in particular consecutive time frames, at the local fixed radio device DEV are input data either for the program module PGM of the Digital Tool DT being executable on the processor PRC or for the processor PRC executing the program module PGM stored in the storage media STM of the Device DEV respectively the System SYS. The input data is provided in the first case by a radio module RM and in the second case by the radio interface RIF.

With respect to the scenario shown in the FIG. 1 and described above the repetitive motion detection/recognition RMDR in the radio range RR is done for all communications being intended or unintended in parallel or for a selected communication, whereby the selection of the communication is software-based/supported.

On the basis of the inputted RSS-values RSS-V the program module PGM of the Digital Tool DT being executable on the processor PRC or the processor PRC executing the program module PGM stored in the storage media STM of the Device DEV respectively the System SYS collects as input data for the repetitive motion detection/recognition RMDR regarding the number of time frames a number of RSS-values related quantities RSS-VRQ, in particular at least one of a number of "Received Signal Strength Indication [RSSI]"-quantities, a number of "Signal to Noise Ratio [SNR]"-quantities, a number of "Channel Quality Indication [CQI]"-quantities, a number of "Packet Reception Rate [PRR]"-quantities, a number of "Packet Loss Rate [PLR]"-quantities, a number of "Signal to Interference Ratio [SIR]"-quantities and a number of "Signal to Interference plus Noise Ratio [SINR]"-quantities.

Figure 4:
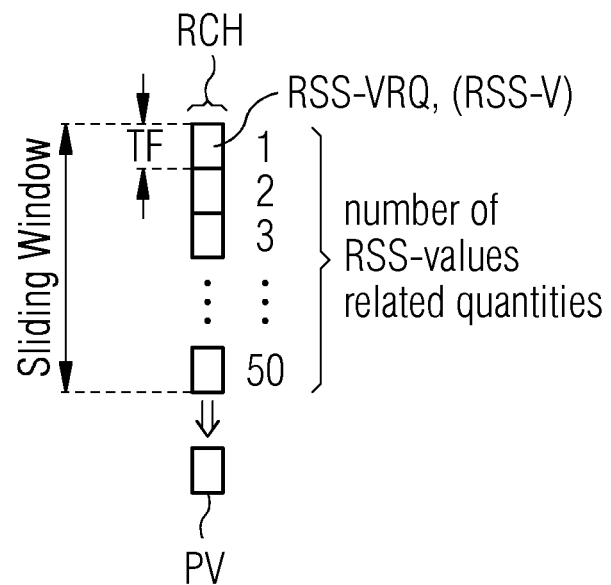
FIG. 4 depicts an embodiment, based on channel structure the evaluation of a pattern in the radio signals due to at least one of reflection, refraction, diffraction and absorption.
Figure 6:
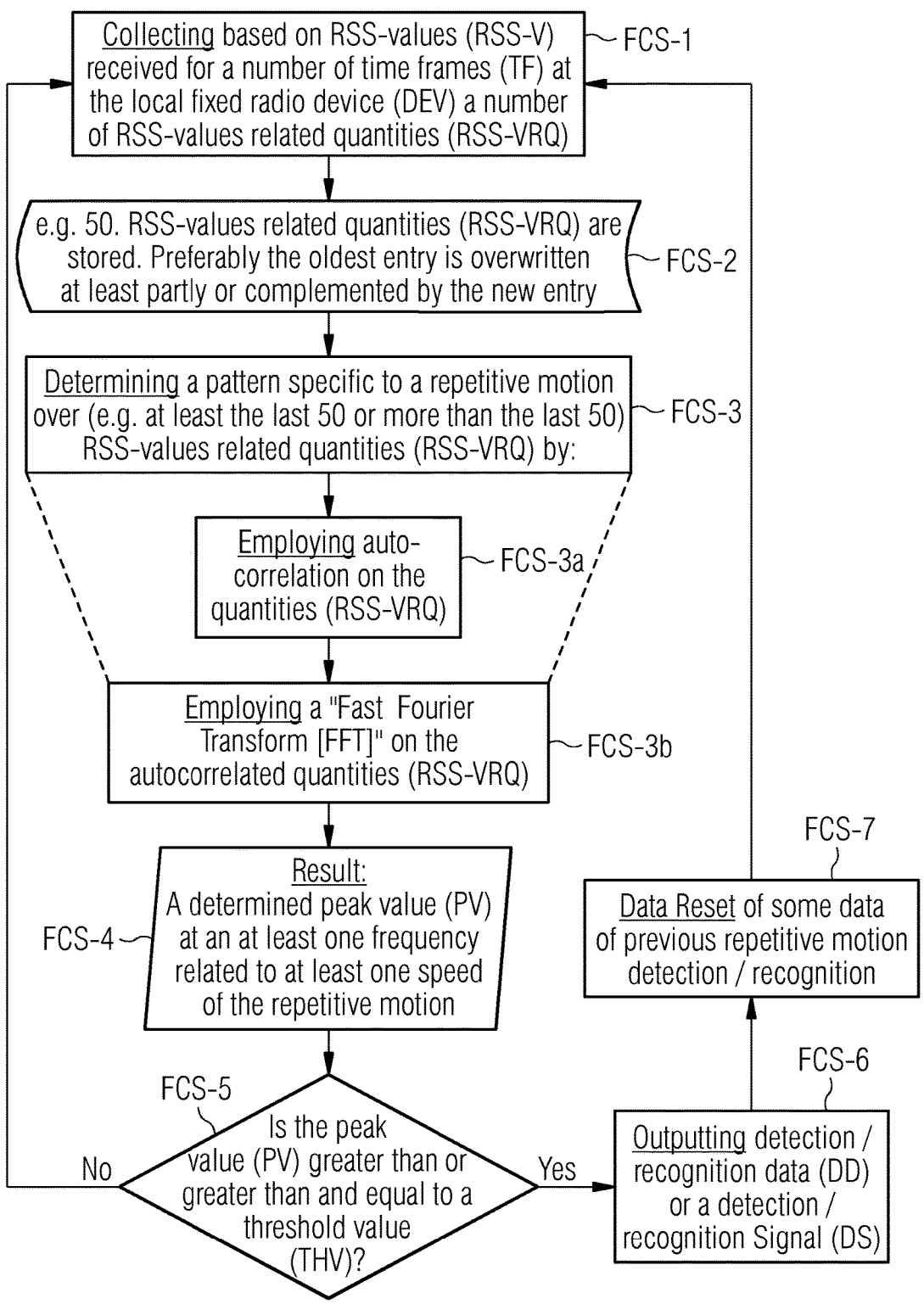
FIG. 6 depicts a flow chart for detecting/recognizing repetitive motions representing an algorithm of the Digital Tool respectively the program module.

The repetitive motion detection/recognition RMDR based on influenced quantifiable radio signals of at least one radio terminal RT transmitting the radio signals on a number of radio channels RCH in the radio range RR as such, which will be described in detail later on with regard to FIGS. 4 and 6, is characterized by a peak value SPV being determined and due to a comparison of the peak value PV at an at least one frequency related to the at least one speed of the repetitive motion with a threshold value THV by at least one detection/recognition data DD or at least one detection/recognition signal DS being outputted and indicating repetitive motions influencing the transmitted radio signals. The indicating of a repetitive motion could be enlarged to alert or notify any number of other Systems or Devices about the status of repetitive motion based upon the supplied data. The Systems or Devices being notified could consist of anything that would benefit from the repetitive motion detection/recognition just being carried out.

The at least one outputted detection/recognition data DD or the at least one detection/recognition signal DS can be used for automatically controlling external devices ED such as domestic appliances or facilities, in particular heating, climate control, lighting or security facility, or in general for home automation and home entertainment.

According to a preferred embodiment concerning to this matter and thereby going back to the FIG. 1 in a terminal-related area TRA of the apartment APT, which is given by the kitchen, the living room, the bedroom and the hall 1, and in which each at least one of the cited radio terminals RT is located in, the external device ED can be controlled separately and/or independently due to each the detection/recognition data DD or the detection/recognition signal DS being generated by the Digital Tool DT, the Device DEV and/or the System SYS for detecting/recognizing repetitive motions with at least one motional speed and each at least one repetition regarding each terminal-related area TRA in the radio range RR.

Thus for example, when with respect to the living room a detection/recognition data DD or a detection/recognition signal is generated due to a gesture of a person, e.g. waving a hand, the lightning in this room can switched ON provided that it was switched OFF before. In parallel, when with respect to the bedroom another detection/recognition data or another detection/recognition signal DS is generated due to a gesture of another person, e.g. also waving a hand, the lightning in this room can switched OFF provided that it was switched ON before.

Due to this given example it can be easily understood that a numerous examples of use are conceivable, which could be used each as a further embodiment.

The external device ED comprises for this purpose a control module CM running on an "external device"-specific controller CRT. In this case the System SYS for detecting/recognizing repetitive motions, in particular rhythmic gestures, in the radio range RR exists, which comprises the Device DEV and the external device ED with the controller CRT and the running control module CM thereon. For such a System SYS the external device ED respectively the controller CTR is connected with the device DEV respectively the processor PRC of the device DEV and forms a functional unit with the device DEV respectively the processor PRC of the device DEV such that at the moment the device DEV respectively the processor PRC of the device DEV is detecting/recognizing a repetitive motion, in particular a rhythmic gesture, an automatic controlling of the external device is carried out via the controller CTR and the running control module CM thereon. Preferably the external device ED being currently switched off is switched on or being currently switched on is switched off.

The Device or Digital Tool DT based on the mentioned functional blocks could be deployed or installed onto any other device with the cited radio interface as long as this device is fixed. So for example, the radio terminal integrated in the television or the wireless access point itself could be appropriate candidates. The environment is also not limited to an apartment. Subway tunnels or outdoor areas could also serve as potential locations. The algorithm itself does not have a maximum number of supported devices.

This parameter is only limited by the hardware on which the algorithm is installed. It should also be mentioned that the Device or Digital Tool DT based on the mentioned functional blocks works independently of any encryption present.

Moreover the Device or Digital Tool DT based on the mentioned functional blocks could be designed such that the received signals will be catalogued depending on their source and destination. Thus as already mentioned above; if a signal is not going to or coming from a dedicated network, the signal could be completely ignored. This is done through analysing the sending and receiving addresses in the header of a wireless frame, and will guarantee that a repetitive motion in a neighboring appartment will have no effect on the repetitive motion detection/recognition.

The algorithms and methods concerning the Digital Tool and implemented inside the Device take advantage of the existing wireless frames sent by the different devices inside the appartment. The WLAN-based the repetitive motion detection/recognition is intrinsicly passive; it is not required to send a wireless frame of any kind to obtain a reading on the repetitive motion. Also of importance is that no additional software is required inside the devices (with the exception of the Device). If for some unexpected reason no wireless traffic exists, no occupancy detection can take place. For such cases, an application may be added to the Device to generate this wireless traffic whenever required.

The Device or Digital Tool DT based on the mentioned functional blocks is able to monitor all radio terminals in the radio range which are communicating intendedly or unintendedly to the appartment's wireless access point. This enables to limit the detection/recognition range to the one single appartment. Depending on the amount of radio terminals and the position of each radio terminal, the Device or Digital Tool DT based on the mentioned functional blocks can be able to detect/recognize repetitive motions in the whole apartment.

Figure 3:
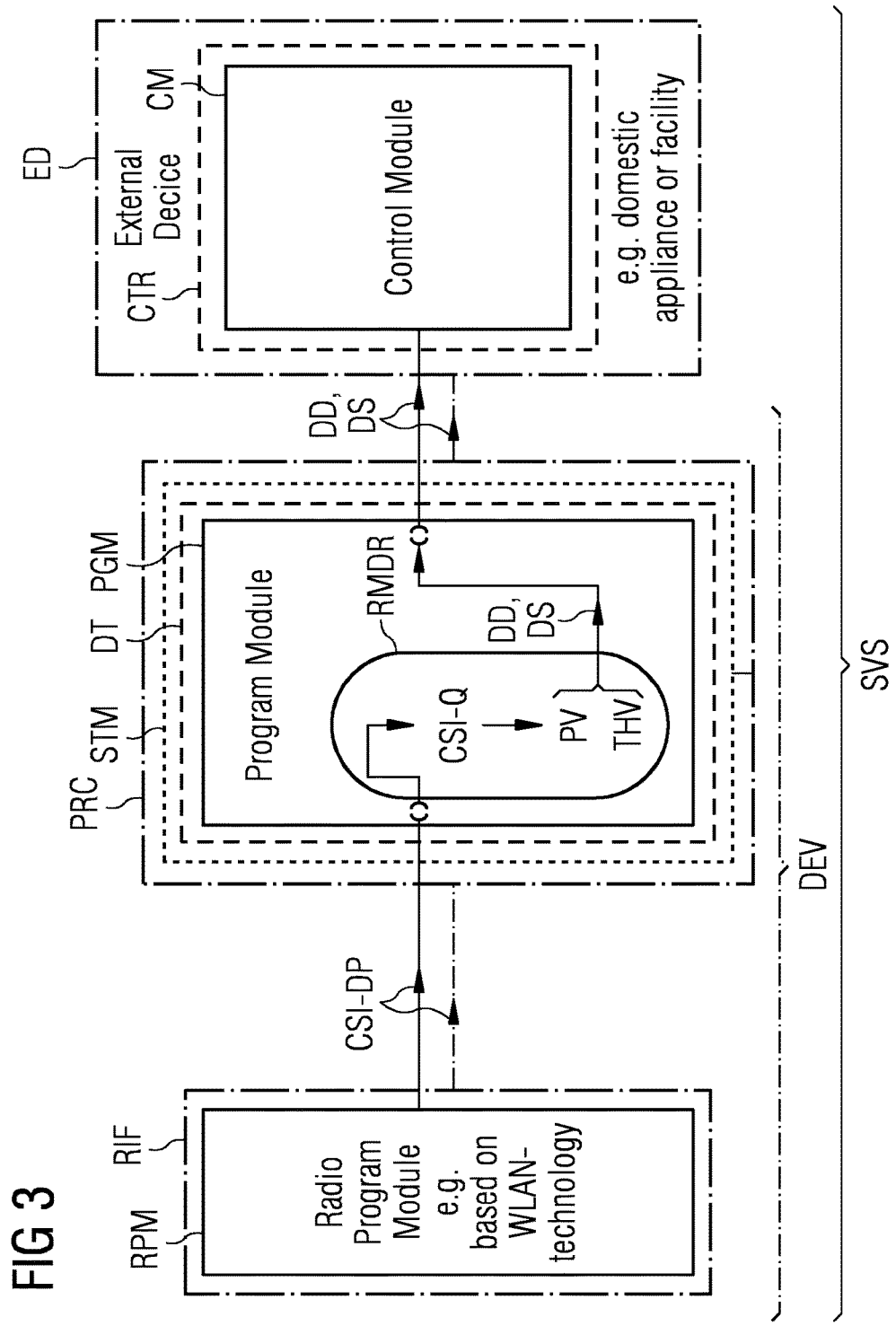
FIG. 3 depicts a layout of an embodiment of a Digital Tool, a device and a system for detecting/recognizing repetitive motions, in particular rhythmic gestures, with at least one motional speed and each at least one repetition in the radio range according to the FIG. 1 as a second embodiment.

FIG. 3 shows a layout based on functional blocks of a Digital Tool DT, the local fixed radio device DEV called as "Device" and a System SYS for detecting/recognizing repetitive motions, in particular rhythmic gestures, with at least one motional speed and each at least one repetition in the radio range RR according to the FIG. 1 as a second embodiment with an "functional block"-interaction on software respective module level (blocks with continuous lines) and on hardware respective device or system level (blocks with dash-dotted lines). All depicted blocks exist in the System SYS, whereas the blocks on the left side and in the middle of the FIG. 3 are part of the Device DEV.

The Digital Tool DT includes (regarding the mentioned software respective module level) a program module PGM being executable on a processor PRC, whereby the program module PGM is preferably downloadable from a server or cloud or is uploadable e.g. via a "Universal Serial Bus [USB]"-stick.

Furthermore (regarding the mentioned hardware respective Device or System level) it is possible that the Digital Tool DT respectively the program module PGM is stored, uploadable or downloadable into a computer-readable storage media STM being inserted or insertable into or integrated in the Device DEV with the processor PRC and the radio interface RIF as mentioned above. The computer-readable storage media STM is assigned to the processor PRC and forms with the processor PRC a common functional unit such that the processor PRC executes the program module PGM stored in the storage media STM.

Regarding the cited options (alternatives) the Digital Tool is preferably an "App" (Application Software) running on a processor of different radio devices, which could be a desktop PC or an "All-In-One" PC incorporating each a radio interface, a smartphone, a notebook, a tablet etc. In other words the Digital Tool is preferably a purpose-designed computer program product. The Digital Tool DT can be sold or distributed separately or in common with the Device DEV or the System SYS for detecting/recognizing repetitive motions. Such a Device or System could be for example a telecommunication appliance, a domestic appliance, a medical appliance, a home automation system, a home entertainment system etc.

For the purpose of a repetitive motion detecting/recognizing RMDR executed by the program module PGM, when according to the scenario shown in the FIG. 1 and described above a number of "Channel State Information [CSI]"-data packets CSI-DP generated due to channel estimation of the local fixed radio device DEV for a number of time frames, in particular consecutive time frames, are input data either for the program module PGM of the Digital Tool DT being executable on the processor PRC or for the processor PRC executing the program module PGM stored in the storage media STM of the Device DEV respectively the System SYS. The input data is provided in the first case by a radio module RM and in the second case by the radio interface RIF.

With respect to the scenario shown in the FIG. 1 and described above the repetitive motion detection/recognition RMDR in the radio range RR is done for all communications being intended or unintended in parallel or for a selected communication, whereby the selection of the communication is software-based/supported.

On the basis of the inputted CSI-data packets CSI-DP the program module PGM of the Digital Tool DT being executable on the processor PRC or the processor PRC executing the program module PGM stored in the storage media STM of the Device DEV respectively the System SYS collects as input data for the repetitive motion detection/recognition RMDR regarding the number of time frames a number of CSI-quantities CSI-Q.

Figure 5:
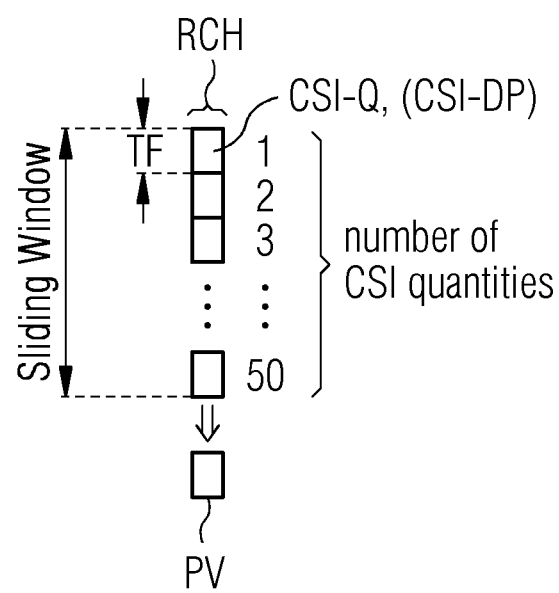
FIG. 5 depicts an embodiment, based on channel structure the evaluation of a pattern in the radio signals due to at least one of reflection, refraction, diffraction and absorption.
Figure 7:
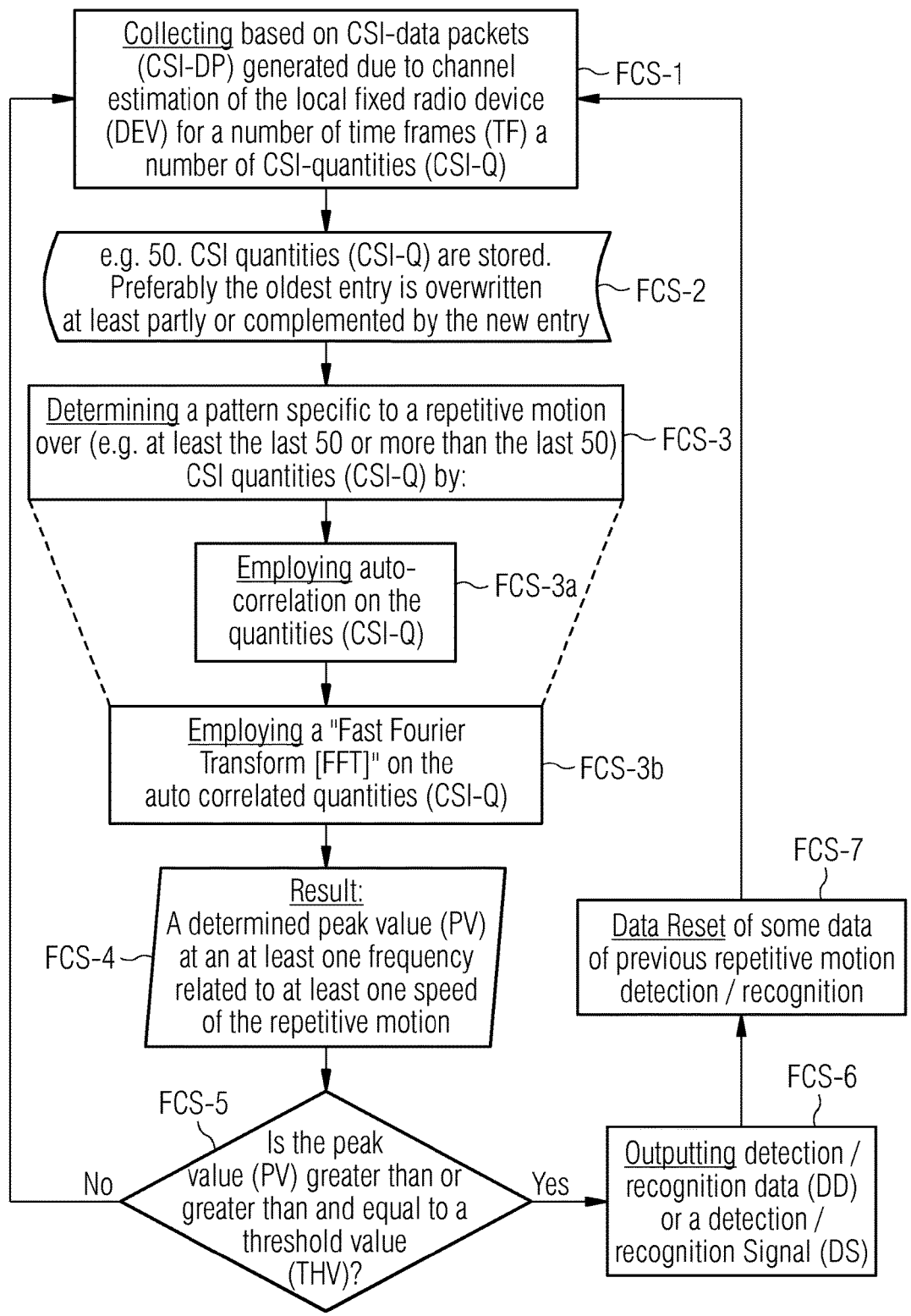
FIG. 7 depicts a flow chart for detecting/recognizing repetitive motions representing an algorithm of the Digital Tool respectively the program module.

The repetitive motion detection/recognition RMDR based on influenced quantifiable radio signals of at least one radio terminal RT transmitting the radio signals on a number of radio channels RCH in the radio range RR as such, which will be described in detail later on with regard to FIGS. 5 and 7, is characterized by a peak value SPV being determined and due to a comparison of the peak value PV at an at least one frequency related to the at least one speed of the repetitive motion with a threshold value THV by at least one detection/recognition data DD or at least one detection/recognition signal DS being outputted and indicating repetitive motions influencing the transmitted radio signals. The indicating of a repetitive motion could be enlarged to alert or notify any number of other Systems or Devices about the status of repetitive motion based upon the supplied data. The Systems or Devices being notified could consist of anything that would benefit from the repetitive motion detection/recognition just being carried out.

The at least one outputted detection/recognition data DD or the at least one detection/recognition signal DS can be used again for automatically controlling external devices ED such as domestic appliances or facilities, in particular heating, climate control, lighting or security facility, or in general for home automation and home entertainment.

Again according to a preferred embodiment concerning to this matter and thereby going back to the FIG. 1 in a terminal-related area TRA of the apartment APT, which is given by the kitchen, the living room, the bedroom and the hall 1, and in which each at least one of the cited radio terminals RT is located in, the external device ED can be controlled separately and/or independently due to each the detection/recognition data DD or the detection/recognition signal DS being generated by the Digital Tool DT, the Device DEV and/or the System SYS for detecting/recognizing repetitive motions with at least one motional speed and each at least one repetition regarding each terminal-related area TRA in the radio range RR.

Once again for example, when with respect to the living room a detection/recognition data DD or a detection/recognition signal is generated due to a gesture of a person, e.g. waving a hand, the lightning in this room can switched ON provided that it was switched OFF before. In parallel, when with respect to the bedroom another detection/recognition data or another detection/recognition signal DS is generated due to a gesture of another person, e.g. also waving a hand, the lightning in this room can switched OFF provided that it was switched ON before.

Due to this given example it can be easily understood again that a numerous examples of use are conceivable, which could be used each as a further embodiment.

The external device ED comprises for this purpose again a control module CM running on an "external device"-specific controller CRT. In this case the System SYS for detecting/recognizing repetitive motions, in particular rhythmic gestures, in the radio range RR exists, which comprises the Device DEV and the external device ED with the controller CRT and the running control module CM thereon. For such a System SYS the external device ED respectively the controller CTR is connected with the device DEV respectively the processor PRC of the device DEV and forms a functional unit with the device DEV respectively the processor PRC of the device DEV such that at the moment the device DEV respectively the processor PRC of the device DEV is detecting/recognizing a repetitive motion, in particular a rhythmic gesture, an automatic controlling of the external device is carried out via the controller CTR and the running control module CM thereon. Preferably the external device ED being currently switched off is switched on or being currently switched on is switched off.

The Device or Digital Tool DT based on the mentioned functional blocks could be deployed or installed again onto any other device with the cited radio interface as long as this device is fixed. So for example, the radio terminal integrated in the television or the wireless access point itself could be appropriate candidates. The environment is also not limited to an apartment. Subway tunnels or outdoor areas could also serve as potential locations. The algorithm itself does not have a maximum number of supported devices. This parameter is only limited by the hardware on which the algorithm is installed. It should also be mentioned that the Device or Digital Tool DT based on the mentioned functional blocks works independently of any encryption present.

Moreover the Device or Digital Tool DT based on the mentioned functional blocks could be designed such again that the received signals will be catalogued depending on their source and destination. Thus as already mentioned above; if a signal is not going to or coming from a dedicated network, the signal could be completely ignored. This is done through analysing the sending and receiving addresses in the header of a wireless frame, and will guarantee that a repetitive motion in a neighboring appartment will have no effect on the the repetitive motion detection/recognition.

The algorithms and methods concerning the Digital Tool and implemented inside the Device take again advantage of the existing wireless frames sent by the different devices inside the appartment. The WLAN-based repetitive motion detection/recognition is intrinsicly passive; it is not required to send a wireless frame of any kind to obtain a reading on the repetitive motion. Also of importance is that no additional software is required inside the devices (with the exception of the Device). If for some unexpected reason no wireless traffic exists, no repetitive motion detection/recognition can take place. For such cases, an application may be added to the Device to generate this wireless traffic whenever required.

The Device or Digital Tool DT based on the mentioned functional blocks is able to monitor again all radio terminals in the radio range which are communicating intendedly or unintendedly to the appartment's wireless access point. This enables to limit the detection/recognition range to the one single appartment. Depending on the amount of radio terminals and the position of each radio terminal, the Device or Digital Tool DT based on the mentioned functional blocks can be able to detect/recognize repetitive motions in the whole apartment.

FIG. 4 shows based on channel structure the evaluation of a pattern in the radio signals due to at least one of reflection, refraction, diffraction and absorption according to the first embodiment. Based on the scenario shown in the FIG. 1 and described hereof at least one radio terminal RT transmits in the radio range RR, in particular relating each to the Fresnel zone FZ on a number of radio channels RCH radio signals, in particular "Wireless Local Area Network [WLAN]"-technology based signals, which are received each by the local fixed radio device DEV due to each an intended or unintended communication between the radio terminal RT and the local radio device DEV.

To evaluate a pattern in the radio signals due to at least one of reflection, refraction, diffraction and absorption it is necessary at the beginning to collect based on RSS-values RSS-V received for a number (e.g. 50) of time frames TF, in particular consecutive time frames TF, at the local fixed radio device a number of RSS-values related quantities RSS-VRQ, which corresponds to the number of time frames TF. The number of time frames is called a "Sliding Window", whereby the term "sliding" means that the number is variable.

The number of RSS-values related quantities RSS-VRQ are e.g. at least one of a number of "Received Signal Strength Indication [RSSI]"-quantities, a number of "Signal to Noise Ratio [SNR]"-quantities, a number of "Channel Quality Indication [CQI]"-quantities, a number of "Packet Reception Rate [PRR]"-quantities, a number of "Packet Loss Rate [PLR]"-quantities, a number of "Signal to Interference Ratio [SIR]"-quantities and a number of "Signal to Interference plus Noise Ratio [SINR]"-quantities, whereby it is preferred that the RSS-values related quantities RSS-VRQ are the number of "Received Signal Strength Indication [RSSI]"-quantities.

Then a pattern specific to a repetitive motion in the collected number of RSS-values related quantities RSS-VRQ is determined in the form of a peak value PV at an at least one frequency related to the at least one speed of the repetitive motion by employing autocorrelation on the RSS-values related quantities RSS-VRQ and a "Fast Fourier Transform [FFT]" on the autocorrelated RSS-values related quantities RSS-VRQ.

The algorithm for analysis consists of collecting preferably RSSI-quantities over a "Sliding Window" of 50 time frames, corresponding to roughly one second, and determining the pattern in the form of the peak value PV within the window. If this peak value PV is over a certain arbitrary and/or experimentally or automatically determined value then a repetitive motion is detected.

Figure 8:
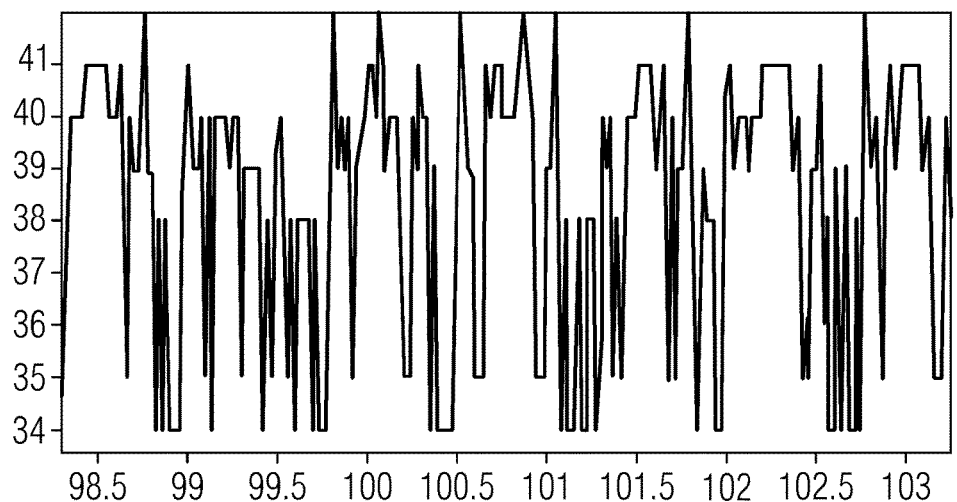
FIG. 8 depicts a first visualization of the measurement and evaluation of the pattern in the radio signals due to at least one of reflection, refraction, diffraction and absorption.
Figure 9:
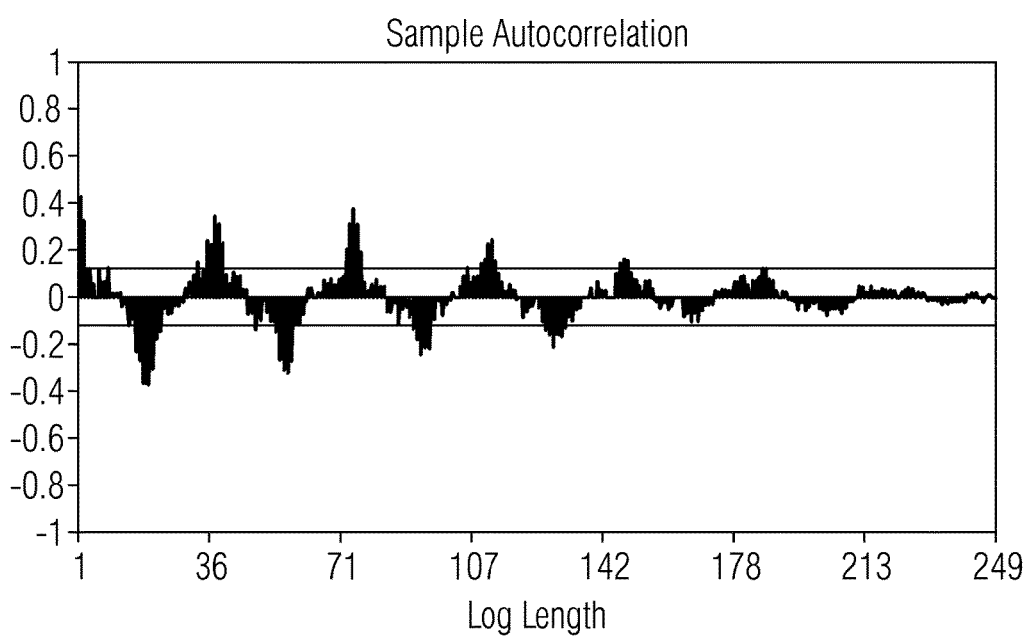
FIG. 9 depicts a second visualization of the measurement and evaluation of the pattern in the radio signals due to at least one of reflection, refraction, diffraction and absorption.
Figure 10:
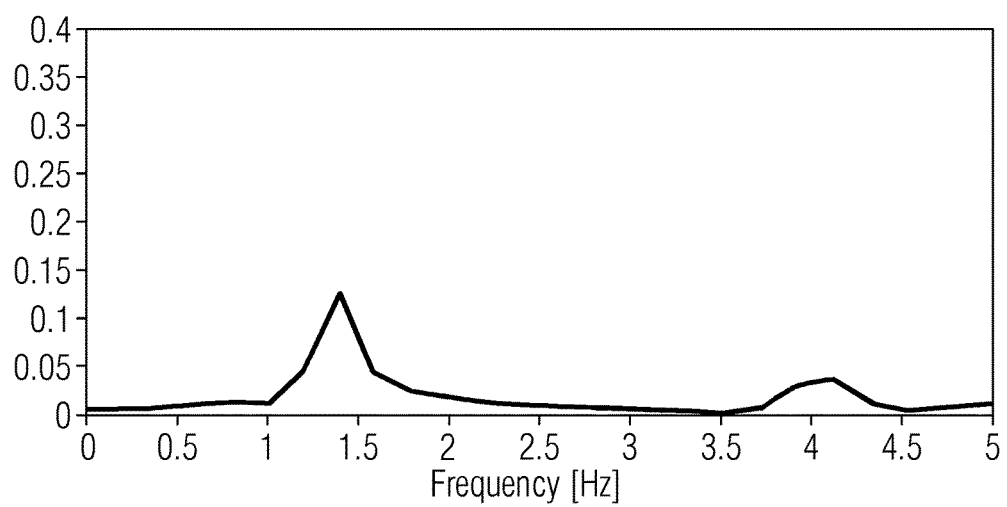
FIG. 10 depicts a third visualization of the measurement and evaluation of the pattern in the radio signals due to at least one of reflection, refraction, diffraction and absorption.

The pattern determined such in the form of a peak value PV at an at least one frequency related to the at least one speed of the repetitive motion is visualized in FIGS. 8 to 10.

The actions to be triggered on a "detection/recognition event" may be determined in advance, or may even be determined dynamically in relation to other conditions like time of day or amount of sunlight outside.

FIG. 5 shows based on channel structure the evaluation of a pattern in the radio signals due to at least one of reflection, refraction, diffraction and absorption according to the second embodiment. Based on the scenario shown in the FIG. 1 and described hereof at least one radio terminal RT transmits in the radio range RR, in particular relating each to the Fresnel zone FZ on a number of radio channels RCH radio signals, in particular "Wireless Local Area Network [WLAN]"-technology based signals, which are received each by the local fixed radio device DEV due to each an intended or unintended communication between the radio terminal RT and the local radio device DEV.

To evaluate a pattern in the radio signals due to at least one of reflection, refraction, diffraction and absorption it is necessary at the beginning to collect based on a number of "Channel State Information [CSI]"-data packets CSI-DP generated due to channel estimation of the local fixed radio device DEV for a number (e.g. 50) of time frames TF, in particular consecutive time frames TF, a number of CSI-quantities CSI-Q, which corresponds to the number of time frames TF. The number of time frames is called a "Sliding Window", whereby the term "sliding" means that the number is variable.

Then a pattern specific to a repetitive motion in the collected number of CSI-quantities CSI-Q is determined in the form of a peak value PV at an at least one frequency related to the at least one speed of the repetitive motion by employing autocorrelation on the CSI-quantities CSI-Q and a "Fast Fourier Transform [FFT]" on the autocorrelated CSI-quantities CSI-Q.

The algorithm for analysis consists of collecting preferably the CSI-quantities CSI-Q over a "Sliding Window" of 50 time frames, corresponding to roughly one second, and determining the pattern in the form of the peak value PV within the window. If this peak value PV is over a certain arbitrary and/or experimentally or automatically determined value then a repetitive motion is detected.

The pattern determined such in the form of a peak value PV at an at least one frequency related to the at least one speed of the repetitive motion is visualized in FIGS. 8 to 10.

The actions to be triggered on a "detection/recognition event" may be determined in advance, or may even be determined dynamically in relation to other conditions like time of day or amount of sunlight outside.

FIG. 6 depicts a flow chart for the repetitive motion detection/recognition RMDR being described in very rudimentary form with reference to the FIG. 4 representing an process (algorithm) of the Digital Tool respectively the program module according to the FIG. 2 using radio signals, in particular "Wireless Local Area Network [WLAN]"-technology based signals, measuring and evaluating the pattern according to the FIG. 4.

In a first flow chart state FCS-1 based on RSS-values RSS-V received for a number (e.g. 50) of time frames TF, in particular consecutive time frames TF, at the local fixed radio device a number of RSS-values related quantities RSS-VRQ is collected, which corresponds to the number of time frames TF.

Then in second flow chart state FCS-2, e.g. 50, RSS-values related quantities RSS-VRQ are stored, whereby preferably the oldest entry is overwritten at least partly. Alternatively it is also possible to complement the old entry by the new entry.

In the following in a third flow chart state FCS-3 a pattern specific to a repetitive motion over, e.g. at least the last 50 or more than the last 50, RSS-values related quantities RSS-VRQ is determined. Therefore according to a first sub-flow chart state FCS-3a to the third flow chart state FCS-3 an autocorrelation is employed on the RSS-values related quantities RSS-VRQ and in the following according to a second sub-flow chart state FCS-3b to the third flow chart state FCS-3 a "Fast Fourier Transform [FFT]" is employed on the autocorrelated RSS-values related quantities RSS-VRQ.

In a subsequent fourth flow chart state FCS-4 the result of the determination of the repetitive motion-specific pattern, a peak value PV at an at least one frequency related to at least one speed of the repetitive motion, is given.

Thereafter in a fifth flow chart state FCS-4 it is checked whether the determined peak value PV is greater than or greater than and equal to a threshold value THV. If the answer of the comparison check is "NO", the repetitive motion detection/recognition process goes back to the first flow chart state FCS-1. However, if the answer of the comparison check is "YES", the repetitive motion detection/recognition process goes on with a sixth flow chart state FCS-6, in which detection data DD or a detection signal DS is outputted.

At this sixth flow chart state FCS-6 the repetitive motion detection/recognition process is finished, however if a new repetitive motion detection/recognition process need to be started again, some data, in particular and preferably those data generated in the flow chart for the repetitive motion detection/recognition RMDR beginning with the third flow chart state FCS-3 and ending with the sixth flow chart state FCS-6, of the finished repetitive motion detection/recognition process could be reset, which is done in a seventh flow chart state FCS-7, before it then goes back to the first flow chart state FCS-1.

FIG. 7 depicts a flow chart for the repetitive motion detection/recognition RMDR being described in very rudimentary form with reference to the FIG. 5 representing an process (algorithm) of the Digital Tool respectively the program module according to the FIG. 3 using radio signals, in particular "Wireless Local Area Network [WLAN]"-technology based signals, measuring and evaluating the pattern according to the FIG. 5

In a first flow chart state FCS-1 based on a number of "Channel State Information [CSI]"-data packets CSI-DP generated due to channel estimation of the local fixed radio device DEV for a number (e.g. 50) of time frames TF, in particular consecutive time frames TF, a number of CSI-quantities CSI-Q is collected, which corresponds to the number of time frames TF.

Then in second flow chart state FCS-2, e.g. 50, CSI-quantities CSI-Q are stored, whereby preferably the oldest entry is overwritten at least partly. Alternatively it is also possible to complement the old entry by the new entry.

In the following in a third flow chart state FCS-3 a pattern specific to a repetitive motion over, e.g. at least the last 50 or more than the last 50, CSI-quantities CSI-Q is determined. Therefore according to a first sub-flow chart state FCS-3a to the third flow chart state FCS-3 an autocorrelation is employed on the CSI-quantities CSI-Q and in the following according to a second sub-flow chart state FCS-3b to the third flow chart state FCS-3 a "Fast Fourier Transform [FFT]" is employed on the autocorrelated CSI-quantities CSI-Q.

In a subsequent fourth flow chart state FCS-4 the result of the determination of the repetitive motion-specific pattern, a peak value PV at an at least one frequency related to at least one speed of the repetitive motion, is given.

Thereafter in a fifth flow chart state FCS-4 it is checked whether the determined peak value PV is greater than or greater than and equal to a threshold value THV. If the answer of the comparison check is "NO", the repetitive motion detection/recognition process goes back to the first flow chart state FCS-1. However, if the answer of the comparison check is "YES", the repetitive motion detection/recognition process goes on with a sixth flow chart state FCS-6, in which detection data DD or a detection signal DS is outputted.

At this sixth flow chart state FCS-6 the repetitive motion detection/recognition process is finished, however if a new repetitive motion detection/recognition process need to be started again, some data, in particular and preferably those data generated in the flow chart for the repetitive motion detection/recognition RMDR beginning with the third flow chart state FCS-3 and ending with the sixth flow chart state FCS-6, of the finished repetitive motion detection/recognition process could be reset, which is done in a seventh flow chart state FCS-7, before it then goes back to the first flow chart state FCS-1.

FIG. 8 depicts a first visualization of the measurement and evaluation of the pattern in the radio signals due to at least one of reflection, refraction, diffraction and absorption. According to this visualization it can be seen the changes in the RSSI over a time of about five seconds (horizontal axis). The RSSI is measured in dBm on the vertical axis. In this particular example the disruption was created by waving a hand.

FIG. 9 shows a second visualization of the measurement and evaluation of the pattern in the radio signals due to at least one of reflection, refraction, diffraction and absorption. According to this visualization it can be seen that the autocorrelation of the raw data. Once the raw RSSI data is obtained, it can be looked for patterns by autocorrelating the data. It can be seen in the FIG. 9 that there is some repetition in the raw data. In fact, this repetition corresponds to the rate at which the hand was waved.

FIG. 10 depicts a third visualization of the measurement and evaluation of the pattern in the radio signals due to at least one of reflection, refraction, diffraction and absorption. According to this visualization it can be seen that the data which has been transformed by a fast Fourier transform to obtain the frequency the maximum value will be located at. In the depicted case there is a peak value at about 1.5 Hz. From this it can be find out that the hand was being waved with a frequency of roughly 1.5 Hz.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A method for detecting in a Fresnel zone-related radio range, repetitive motions with at least one motional speed and at least one repetition, wherein the repetitive motions are significantly distinct such that they influence radio signals transmitted on a number of radio channels by at least one radio terminal and received by a local fixed radio device in the Fresnel zone-related radio range as well as given by an intended or unintended communication between the radio terminal and the local fixed radio device, the method comprising:
  a) collecting as input data for the repetitive motion detection in a <n>-th cycle with the control variable <n> steps of the repetitive motion detection are run through, regarding the intended or unintended communication and based on:
    a1) Radio Signal Strength values received for a <n>-th number of consecutive time frames at the local fixed radio device a <n>-th number of Radio Signal Strength values related quantities or
    a2) a <n>-th number of Channel State Information data packets generated due to channel estimation of the local fixed radio device for a <n>-th number of frames, a <n>-th number of Channel State Information quantities;
  b) determining a pattern specific to a repetitive motion in the collected <n>-th number of Radio Signal Strength values related quantities or the <n>-th number of Channel State Information quantities in the form of a peak value at an at least one frequency related to the at least one motional speed of the repetitive motion by employing autocorrelation on the quantities and a "Fast Fourier Transform" on the autocorrelated quantities,
  c) comparing the peak value with a threshold value such that, if the peak value exceeds or equals the threshold value,
    (c1) at least one detection data or at least one detection signal indicating a repetitive motion is outputted, otherwise:
    c2) the control variable <n>is exceeded by "1" for additional i-th iterations of the collecting step with i=1,2,3, . . . k and k∈$N$, , wherein a first additional iteration starts at i=1 and a last additional iteration ends at i=k,
    and for the additional i-th iteration in a <n+i>-th cycle with the control variable n∈$N$, , regarding the intended or unintended communication and based on:

c21) the Radio Signal Strength values received for a <n+i>-th number of time frames at the local fixed radio device a <n+i>-th number of Radio Signal Strength values related quantities are collected as input data for the repetitive motion detection, or c22) a <n+i>-th number of Channel State Information data packets generated due to channel estimation of the local fixed radio device for a <n+i>-th number of time frames, a <n+i>-th number of Channel State Information quantities, are collected as input data for the repetitive motion detection, c3) wherein the <n>-th number and the <n+i>-th number are equal or different from each other and the <n+i>-th number of Radio Signal Strength values related quantities respectively the <n+i>-th number of Channel State Information quantities either replace at least partly or complement the <n>-th number of Radio Signal Strength values related quantities respectively the <n>-th Channel State Information quantities, in order to go on with the repetitive motion detection according to further running through the steps b) to c2) thereby defining first <n+1−1>:=<n+i>and second i:=i+1.

2. The method according to claim 1, wherein at least one intended or unintended communication is present between the radio terminal and the local radio device and the repetitive motion detection in the Fresnel zone-related radio range is done for all communications in the Fresnel zone-related radio range in parallel or for a selected communication, wherein the selection of the communication is software-based/supported.

3. The method according to claim 1, wherein when according to step c1) the detection data or the detection signal indicating the corresponding repetitive motion is outputted, a new repetitive motion detection is initiated, comprising repeating the steps a) to c2) after a data reset of the previous repetitive motion detection.

4. The method according to claim 1, wherein the <n>-th and <n+i>-th number of Radio Signal Strength value related quantities or Channel State Information quantities are arbitrary.

5. The method according to claim 1, wherein the threshold value is at least one of arbitrary, determined experimentally, and determined automatically.

6. The method according to claim 1, wherein the at least one detection data or the at least one detection signal is used for automatically controlling an external device such as domestic appliances or facilities for heating, climate control, lighting, security home automation and home entertainment.

7. The method according to claim 6, wherein the at least one frequency related to the at least one motional speed of the repetitive motion the peak value is determined at, is used to code a freely selectable operational status of the external device.

8. The method of claim 1, wherein the <n>-th number of Received Signal Strength values related quantities is at least one of a <n>-th number of Received Signal Strength Indication quantities, a <n>-th number of Signal to Noise Ratio quantities, a <n>-th number of Channel Quality Indication quantities, a <n>-th number of Packet Reception Rate quantities, a <n>-th number of Packet Loss Rate quantities, a <n>-th number of Signal to Interference Ratio quantities and a <n>-th number of Signal to Interference plus Noise Ratio quantities, and wherein the <n+i>-th number of Received Signal Strength values related quantities is at least one of a <n+i>-th number of Received Signal Strength Indication quantities, a <n+i>-th number of Signal to Noise Ratio quantities, <n+i>-th number of Channel Quality Indication quantities, <n+i>-th number of Packet Reception Rate quantities, a <n+i>-th number of Packet Loss Rate quantities, a <n+i>-th number of Signal to Interference Ratio quantities and a <n+i>-th number of Signal to Interference plus Noise Ratio quantities.

9. The method of claim 1, wherein the radio range is in an indoor area.

10. The method of claim 1, wherein the repetitive motions are rhythmic gestures.

11. The method of claim 1, wherein the times frames are consecutive ones.

12. The method according to claim 1, wherein the at least one detection data or the at least one detection signal is used each in a terminal-related area of the Fresnel zone-related radio range the terminal is located in.

13. The method according to claim 4, wherein the <n>-th and <n+i>-th number of Received Signal Strength values related quantities or Channel State Information quantities are equal to 50.

14. A Digital Tool for detecting in a Fresnel zone-related radio range, repetitive motions, with at least one motional speed and at least one repetition, wherein the repetitive motions are significantly distinct such that they influence radio signals transmitted on a number of radio channels by at least one by at least one radio terminal and received by a local fixed radio device in the Fresnel zone-related radio range, as well as given by an intended or unintended communication between the radio terminal and the local fixed radio device, wherein a program module for data processing is executable on a processor of the local fixed radio device, and designed such to a) collect as input data for the repetitive motion detection in a <n>-th cycle with the control variable n∈ $\mathbb{N}$, , steps of the repetitive motion detection are run through, regarding the intended or unintended communication and based on:

a1) Radio Signal Strength-values received for a <n>-th number of time frames at the local fixed radio device; a <n>-th number of Radio Signal Strength values related quantities or a2) a <n>-th number of Channel State Information data packets generated due to channel estimation of the local fixed radio device for a <n>-th number of time frames, a <n>-th number of Channel State Information quantities, b) determine a pattern specific to a repetitive motion in the collected <n>-th number of Radio Signal Strength values related quantities or the <n>-th number of Channel State Information quantities in the form of a peak value at an at least one frequency related to the at least one motional speed of the repetitive motion by employing autocorrelation on the quantities and a "Fast Fourier Transform" on the autocorrelated quantities, c) compare the peak value with a threshold value such that, if the peak value exceeds or equals the threshold value, c1) at least one detection data or at least one detection signal indicating a repetitive motion is outputted, otherwise c2) the control variable <n>is exceeded by "1" for additional i-th iterations of the collecting step with i=1,2,3, . . . k and k∈ $\mathbb{N}$, , wherein a first additional iteration starts at i=1 and a last additional iteration ends at i=k, and for the additional i-th iteration in a <n+i>-th cycle with the control variable n∈ℕ, regarding the intended or unintended communication and based on:
- c21) the Radio Signal Strength values received for a <n+i>-th number of time frames at the local fixed radio device a <n+i>-th number of Radio Signal Strength values related quantities, are collected as input data for the repetitive motion detection or
- c22) a <n+i>-th number of Channel State Information data packets generated due to channel estimation of the local fixed radio device for a <n+i>-th number of time frames a <n+i>-th number of Channel State Information quantities, are collected as input data for the repetitive motion detection,
- c3) wherein the <n>-th number and the <n+i>-th number are equal or different from each other and the <n+i>-th number of Radio Signal Strength values related quantities respectively the <n+i>-th number of Channel State Information quantities either replace at least partly or complement the <n>-th number of Radio Signal Strength values related quantities respectively the <n>-th Channel State Information quantities, in order to go on with the repetitive motion detection according to further running through the steps b) to c2) thereby defining first <n+i-1>:=<n+i> and second i:=i+1.

15. The Digital Tool according to claim 14, wherein at least one intended or unintended communication is present between the radio terminal and the local radio device and the program module executable on the processor is designed such that the repetitive motion detection in the Fresnel zone-related radio range is done for all communications in parallel or for a selected communication, wherein the selection of the communication is software-based/supported.

16. The Digital Tool according to claim 14, wherein the program module is downloadable from a server or cloud.

17. The Digital Tool according to claim 14, wherein the program module is uploadable via a Universal Serial Bus stick.

18. The Digital Tool according to claim 14, wherein the program module executable on the processor is designed such that, when according to step c1) the detection data or the detection signal indicating the corresponding repetitive motion is outputted, a new repetitive motion detection is initiated, comprising repeating the steps a) to c3) after a data reset of the previous repetitive motion detection.

19. The Digital Tool according to claim 14, wherein the program module executable on the processor is designed such that the <n>-th and <n+i>-th number of Radio Signal Strength values related quantities or Channel State Information quantities are arbitrary.

20. The digital tool according to claim 19, wherein the <n>-th and <n+i>-th number of Received Signal Strength values related quantities or Channel State Information quantities are equal to 50.

21. The Digital Tool according to claim 14, wherein the program module executable on the processor is designed such that the threshold value is at least one of arbitrary, determined experimentally, and determined automatically.

22. The Digital Tool according to claim 14, wherein the program module executable on the processor is designed such that the at least one detection data or the at least one detection signal is used for automatically controlling external devices such as domestic appliances or facilities for heating, climate control, lighting, security or home automation and home entertainment.

23. The Digital Tool according to claim 22, wherein the program module executable on the processor is designed such that the at least one frequency related to the at least one motional speed of the repetitive motion, the peak value is determined at, is used to code a freely selectable operational status of the external device.

24. The digital tool of claim 14, wherein the <n>-th number of Received Signal Strength values related quantities is at least one of a <n>-th number of Received Signal Strength Indication quantities, a <n>-th number of Signal to Noise Ratio quantities, a <n>-th number of Channel Quality Indication quantities, a <n>-th number of Packet Reception Rate quantities, a <n>-th number of Packet Loss Rate quantities, a <n>-th number of Signal to Interference Ratio quantities and a <n>-th number of Signal to Interference plus Noise Ratio quantities, and
wherein the <n+i>-th number of Received Signal Strength values related quantities is at least one of a <n+i>-th number of Received Signal Strength Indication quantities, a <n+i>-th number of Signal to Noise Ratio quantities, <n+i>-th number of Channel Quality Indication quantities, <n+i>-th number of Packet Reception Rate quantities, a <n+i>-th number of Packet Loss Rate quantities, a <n+i>-th number of Signal to Interference Ratio quantities and a <n+i>-th number of Signal to Interference plus Noise Ratio quantities.

25. The digital tool of claim 14, wherein the radio range is in an indoor area.

26. The digital tool of claim 14, wherein the repetitive motions are rhythmic gestures.

27. The digital tool of claim 14, wherein the times frames are consecutive ones.

28. The digital tool according to claim 14, wherein the program module being executable on the processor is designed such that the at least one detection data or the at least one detection signal is used each in a terminal-related area of the Fresnel zone-related radio range the terminal is located in.

29. A device for detecting in a Fresnel zone-related radio range, repetitive motions with at least one motional speed and at least one repetition, wherein the repetitive motions are significantly distinct such that they influence radio signals transmitted on a number of radio channels by at least one radio terminal in the Fresnel zone-related radio range and given by an intended or unintended communication between the radio terminal and the device being localized and fixed, including
- a radio interface including a radio program module receiving the transmitted radio signals and
- a processor with a computer-readable storage media and being connected to the radio interface with the radio program module, wherein the processor executes for the repetitive motion detection a program module for data processing, which is stored or uploadable or downloadable into the storage media, such to:
- a) collect as input data for the repetitive motion detection in a <n>-th cycle with the control variable n∈ℕ, steps of the repetitive motion detection are run through, regarding the intended or unintended communication and based on:
  - a1) Radio Signal Strength-values received for a <n>-th number of time frames at the device a <n>-th number of Radio Signal Strength values related quantities or a2) a <n>-th number of Channel State Information data packets generated due to channel estimation of the device for a <n>-th number of time frames, a <n>-th number of Channel State Information quantities, b) determine a pattern specific to a repetitive motion in the collected <n>-th number of Radio Signal Strength values related quantities or the <n>-th number of Channel State Information quantities in the form of a peak value at an at least one frequency related to the at least one motional speed of the repetitive motion by employing autocorrelation on the quantities and a Fast Fourier Transform on the autocorrelated quantities, c) compare the peak value with a threshold value such that, if the peak value exceeds or equals the threshold value, (c1) at least one detection data or at least one detection signal indicating a repetitive motion is outputted, otherwise:

c2) the control variable <n> is exceeded by "1" for additional i-th iterations of the collecting step with i=1,2,3, . . . k and k∈$\mathbb{N}$, wherein a first additional iteration starts at i=1 and a last additional iteration ends at i=k, and for the additional i-th iterations in a <n+i>-th cycle with the control variable n∈$\mathbb{N}$, regarding the intended or unintended communication and based on:

c21) the Radio Signal Strength values received for a <n+i>-th number of time frames at the device a <n+i>-th number of Radio Signal Strength values related quantities are collected as input data for the repetitive motion detection or c22) a <n+i>-th number of Channel State Information data packets generated due to channel estimation of the device for a <n+i>-th number of time frames a <n+i>-th number of Channel State Information quantities, are collected as input data for the repetitive motion detection, c3) wherein the <n>-th number and the <n+i>-th number are equal or different from each other and the <n+i>-th number of Radio Signal Strength values related quantities respectively the <n+i>-th number of Channel State Information quantities either replace at least partly or complement the <n>-th number of Radio Signal Strength values related quantities respectively the <n>-th Channel State Information quantities, in order to go on with the repetitive motion detection according to further running through the steps b) to c2) thereby defining first <n+i−1>:=<n+i> and second i:=i+1.

30. The device according to claim 29, wherein at least one intended or unintended communication is present between the radio terminal and the local radio device and the processor executes the radio program module for the repetitive motion detection/recognition such that the repetitive motion detection in the Fresnel zone-related radio range is done for all communications in parallel or for a selected communication, wherein the selection of the communication is software-based/supported.

31. The device as claimed in claim 29, wherein the radio interface (RIF) is a Wireless Local Area Network radio interface.

32. The device of claim 29, wherein the <n>-th number of Received Signal Strength values related quantities is at least one of a <n>-th number of Received Signal Strength Indication quantities, a <n>-th number of Signal to Noise Ratio quantities, a <n>-th number of Channel Quality Indication quantities, a <n>-th number of Packet Reception Rate quantities, a <n>-th number of Packet Loss Rate quantities, a <n>-th number of Signal to Interference Ratio quantities and a <n>-th number of Signal to Interference plus Noise Ratio quantities, and wherein the <n+i>-th number of Received Signal Strength values related quantities is at least one of a <n+i>-th number of Received Signal Strength Indication quantities, a <n+i>-th number of Signal to Noise Ratio quantities, <n+i>-th number of Channel Quality Indication quantities, <n+i>-th number of Packet Reception Rate quantities, a <n+i>-th number of Packet Loss Rate quantities, a <n+i>-th number of Signal to Interference Ratio quantities and a <n+i>-th number of Signal to Interference plus Noise Ratio quantities.

33. The device of claim 29, wherein the repetitive motions are rhythmic gestures.

34. The device of claim 29, wherein the times frames are consecutive ones.

35. The device of claim 29, wherein the radio range is in an indoor area.

36. A system for detecting in a Fresnel zone-related radio range of, repetitive motions with at least one motional speed and at least one repetition, wherein the repetitive motions are significantly distinct such that they influence radio signals transmitted on a number of radio channels by at least one radio terminal, and given by an intended or unintended communication between the radio terminal and a device according to claim 29, including:

the device and an external device, wherein the external device contains a controller and a running control module thereon for automatically controlling the external device, which is connected with the device and forms a functional unit with the device such that in the moment the device detects a repetitive or rhythmic gesture an automatic controlling of the external device is carried out via the controller.

37. The system according to claim 36, wherein the external device is a domestic appliance or facility for heating, climate control, lighting, security or home automation and home entertainment.

38. The system according to claim 36, wherein the automatic controlling of the external device carried out via the controller is to switch on the external device, if it is switched off or to switch off the external device, if it is switched on.

* * * * *